US012788074B2

(12) United States Patent
Aoyama et al.

(10) Patent No.: US 12,788,074 B2
(45) Date of Patent: Nov. 10, 2026

(54) POWER SUPPLY UNIT FOR AEROSOL GENERATING DEVICE

(71) Applicant: Japan Tobacco Inc., Tokyo (JP)

(72) Inventors: Tatsunari Aoyama, Tokyo (JP); Hiroshi Kawanago, Tokyo (JP); Toru Nagahama, Tokyo (JP); Takashi Fujiki, Tokyo (JP); Ryo Yoshida, Tokyo (JP)

(73) Assignee: JAPAN TOBACCO INC., Tokyo (JP)

( * ) Notice: Subject to any disclaimer, the term of this patent is extended or adjusted under 35 U.S.C. 154(b) by 541 days.

(21) Appl. No.: 18/502,045

(22) Filed: Nov. 5, 2023

(65) Prior Publication Data

US 2024/0065344 A1 Feb. 29, 2024

Related U.S. Application Data

(63) Continuation of application No. PCT/JP2022/009443, filed on Mar. 4, 2022.

(30) Foreign Application Priority Data

May 10, 2021 (JP) ................................ 2021-079869

(51) Int. Cl.
*H01M 10/46* (2006.01)
*A24F 40/40* (2020.01)
(Continued)

(52) U.S. Cl.
CPC .............. *A24F 40/90* (2020.01); *A24F 40/40* (2020.01); *A24F 40/50* (2020.01); *A24F 40/60* (2020.01);
(Continued)

(58) Field of Classification Search
CPC .... H02J 7/933; H02J 7/865; H02J 7/70; H02J 2207/20; H02M 1/0054; H02M 1/0032;
(Continued)

(56) References Cited

U.S. PATENT DOCUMENTS

2009/0322287 A1* 12/2009 Ozeki ...................... H02J 7/56 320/145
2020/0120991 A1 4/2020 Hatton et al.

FOREIGN PATENT DOCUMENTS

CN 109430946 A 3/2019
CN 210143837 U 3/2020
(Continued)

OTHER PUBLICATIONS

Extended European Search Report issued Apr. 9, 2025 in corresponding European Patent Application No. 22807112.2, 6 pages.
(Continued)

*Primary Examiner* — Edward Tso
(74) *Attorney, Agent, or Firm* — XSENSUS LLP

(57) ABSTRACT

A power supply unit for an aerosol generating device includes a power supply, a heater connector connected to a heater configured to heat an aerosol source by consuming power supplied from the power supply, a connector electrically connectable to an external power supply, a charging IC which includes an input terminal connected to the connector and a charging terminal connected to the power supply, and is configured to convert power input to the input terminal and output power which is converted from the charging terminal, and a first load having one end connected in parallel with the input terminal. The charging IC is configured to supply power input from the power supply to the charging terminal to the first load via the input terminal.

17 Claims, 20 Drawing Sheets

(51) Int. Cl.
*A24F 40/50* (2020.01)
*A24F 40/60* (2020.01)
*A24F 40/90* (2020.01)
*H02J 7/00* (2006.01)
*H02J 7/70* (2026.01)

(52) U.S. Cl.
CPC ................ *H02J 7/70* (2026.01); *H02J 7/865* (2026.01); *H02J 2207/20* (2020.01)

(58) Field of Classification Search
CPC ........ H02M 1/32; H02M 3/158; H02M 3/156; A24F 40/90; A24F 40/20; A24F 40/95; A24F 40/46; A24F 40/50; A24F 40/60
USPC ......................... 320/107, 114, 115, 134, 136
See application file for complete search history.

(56) References Cited

FOREIGN PATENT DOCUMENTS

| | | | | |
|---|---|---|---|---|
| JP | 6681963 B1 | | 4/2020 | |
| WO | 2017/084920 A2 | | 5/2017 | |
| WO | WO-2021177100 A1 | * | 9/2021 | ................ H02J 3/32 |

OTHER PUBLICATIONS

International Search Report and Written Opinion mailed on Apr. 19, 2022, received for PCT Application PCT/JP2022/009443, filed on Mar. 4, 2022, 9 pages including English Translation.

* cited by examiner

POWER SUPPLY UNIT FOR AEROSOL GENERATING DEVICE

CROSS-REFERENCE TO RELATED APPLICATIONS

This is a continuation of International Application No. PCT/JP2022/009443 filed on Mar. 4, 2022, and claims priority from Japanese Patent Application No. 2021-079869 filed on May 10, 2021, the entire content of each is incorporated herein by reference.

TECHNICAL FIELD

The present invention relates to a power supply unit for an aerosol generating device.

BACKGROUND ART

WO 2017/084920 discloses a module which includes a first coupling element adapted to be connected to an electronic smoking device portion, a second coupling element adapted to be connected to a portable electronic device, and a power supply element adapted to supply power to the portable electronic device and the electronic smoking device portion, and which supplies energy received from the portable electronic device via the second coupling element to the power supply element.

CN109430946A and CN210143837U disclose an electronic cigarette including a micro USB charging interface.

In an aerosol generating device capable of inhaling aerosol to which flavor is added, various accessories such as an integrated circuit (IC) and a user interface (U/I) are mounted in addition to a heater in accordance with higher functionality. When an appropriate power supply voltage (operating voltage) is not supplied to each of these accessories, an unintended operation or a failure may occur. When an output voltage of the power supply is converted to generate the appropriate power supply voltage (operating voltage), an electronic component for the conversion is required, which prevents miniaturization and cost reduction.

SUMMARY

An object of the present invention is to provide an aerosol generating device capable of achieving miniaturization and cost reduction simultaneously with higher functionality.

According to an aspect of the present disclosure, there is provided a power supply unit for an aerosol generating device including a power supply, a heater connector connected to a heater configured to heat an aerosol source by consuming power supplied from the power supply, a connector electrically connectable to an external power supply, a charging IC which includes an input terminal connected to the connector and a charging terminal connected to the power supply, and is configured to convert power input to the input terminal and output power which is converted from the charging terminal, and a first load having one end connected in parallel with the input terminal, in which the charging IC is configured to supply power input from the power supply to the charging terminal to the first load via the input terminal.

According to the present invention, it is possible to provide an aerosol generating device capable of achieving miniaturization and cost reduction simultaneously with higher functionality.

DESCRIPTION OF EMBODIMENTS

Hereinafter, an inhaling system as an embodiment of an aerosol generating device according to the present invention will be described with reference to the drawings. The inhaling system includes a non-combustion inhaler 100 (hereinafter, also simply referred to as "inhaler 100") which is an embodiment of a power supply unit according to the present invention, and a rod 500 heated by the inhaler 100. In the following description, a configuration in which the inhaler 100 accommodates a heating unit in an undetachable manner will be described as an example. However, the heating unit may be attachable to and detachable from the inhaler 100. For example, the rod 500 and the heating unit may be integrated and attachable to and detachable from the inhaler 100. That is, the power supply unit for the aerosol generating device may not include the heating unit as a component. The term "undetachable" refers to an aspect in which detachment cannot be performed as long as in an assumed application. Alternatively, an induction heating coil provided in the inhaler 100 and a susceptor built in the rod 500 may cooperate to constitute the heating unit.

Figure 1:
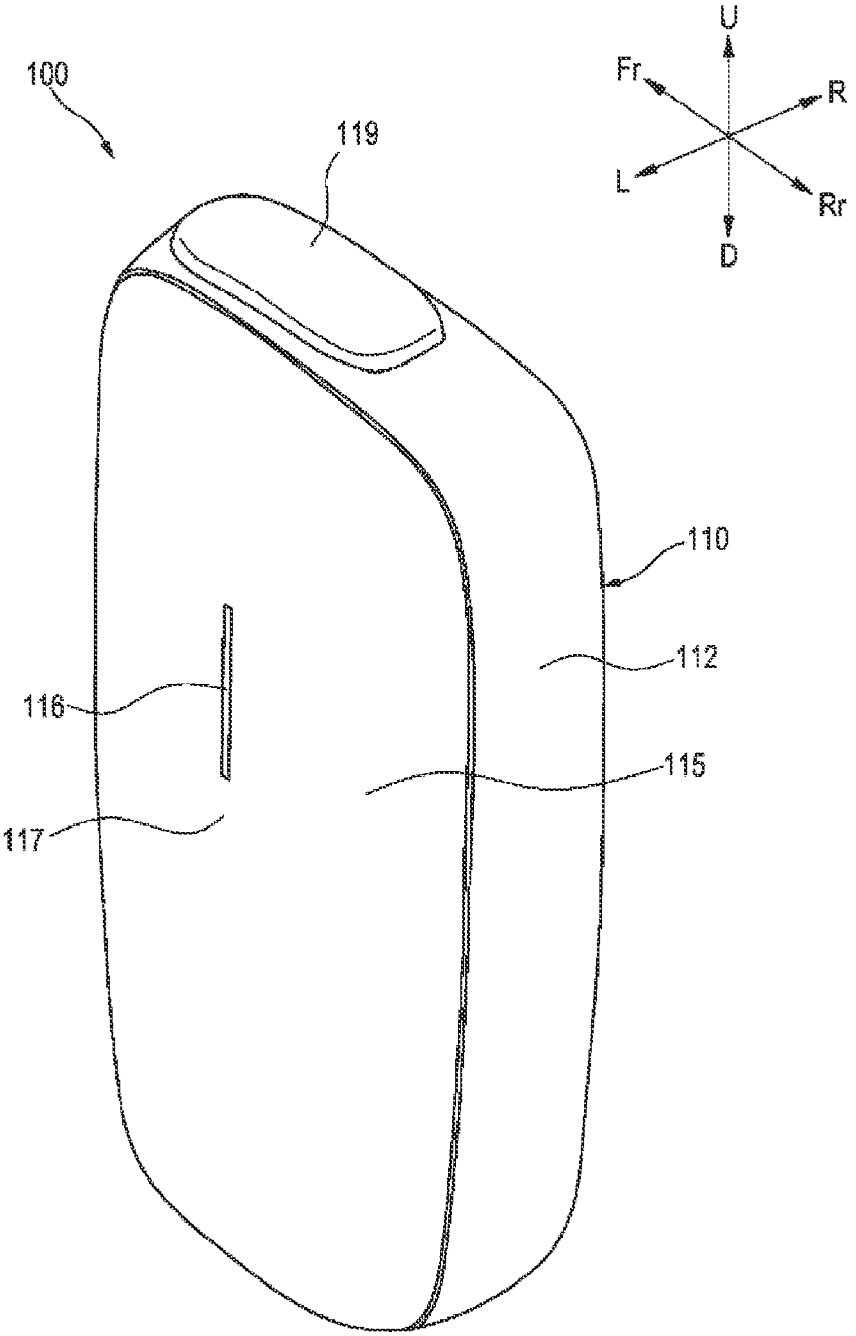
FIG. 1 is a perspective view of a non-combustion inhaler.
Figure 2:
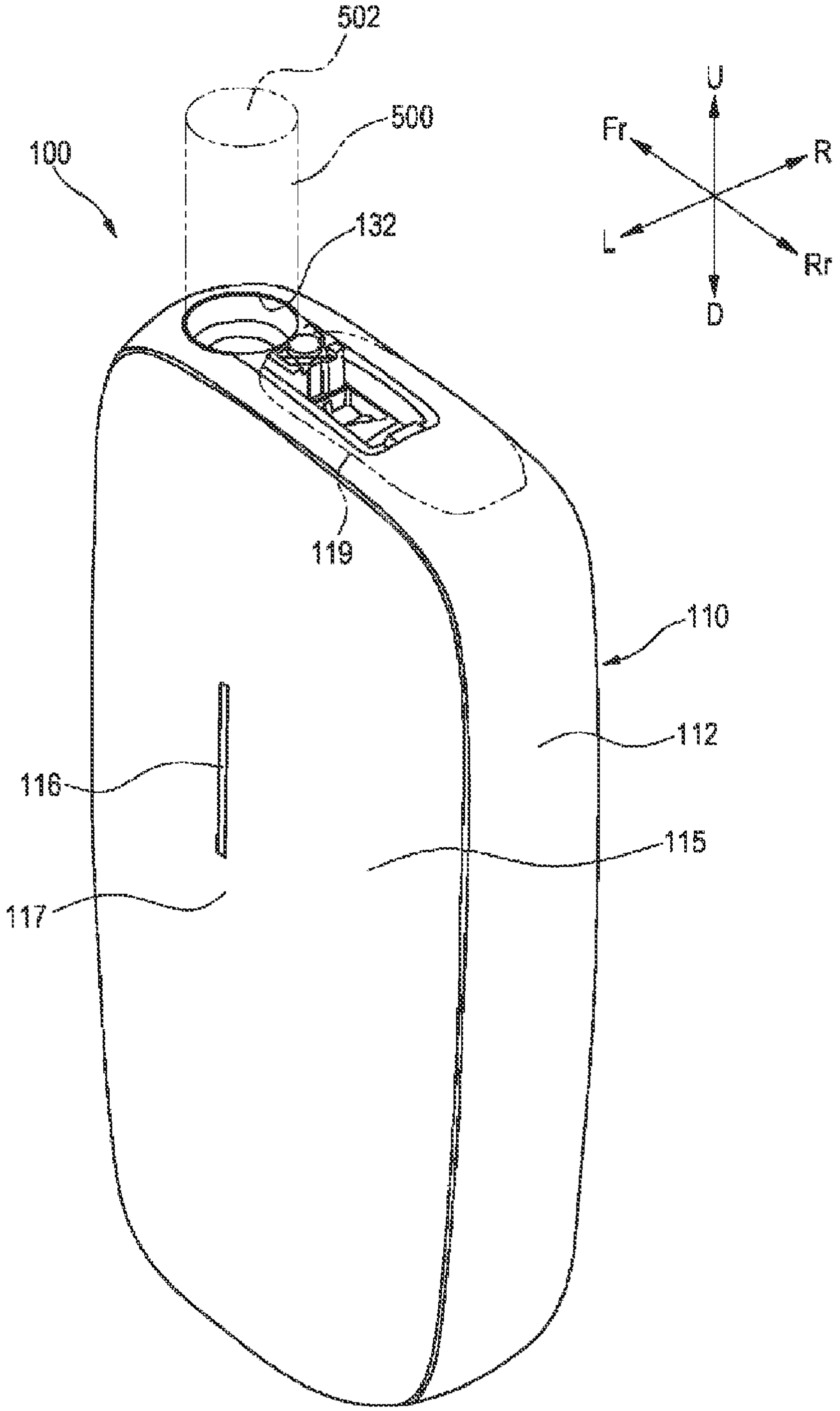
FIG. 2 is a perspective view of the non-combustion inhaler with a rod attached.
Figure 3:
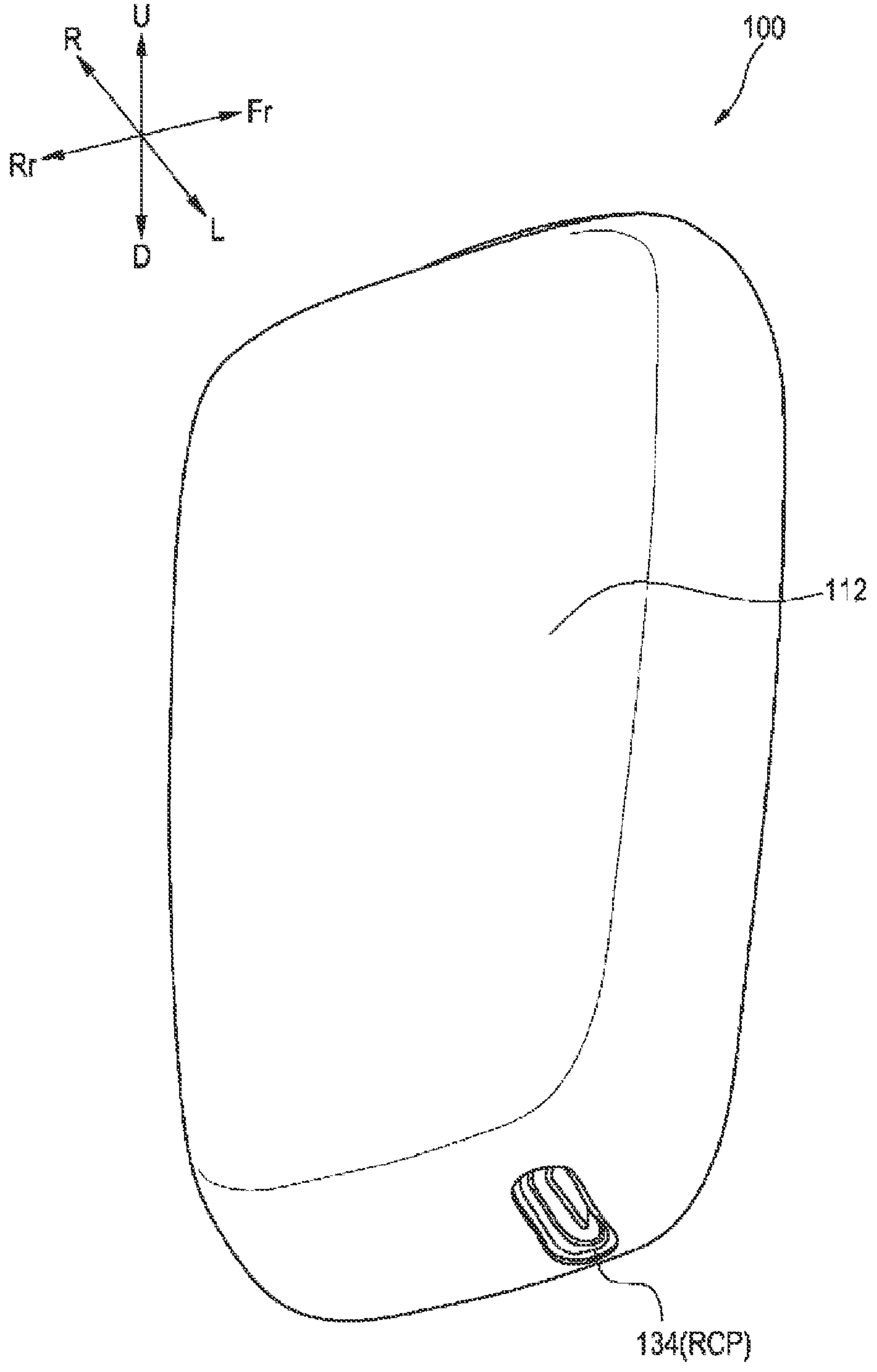
FIG. 3 is another perspective view of the non-combustion inhaler.
Figure 4:
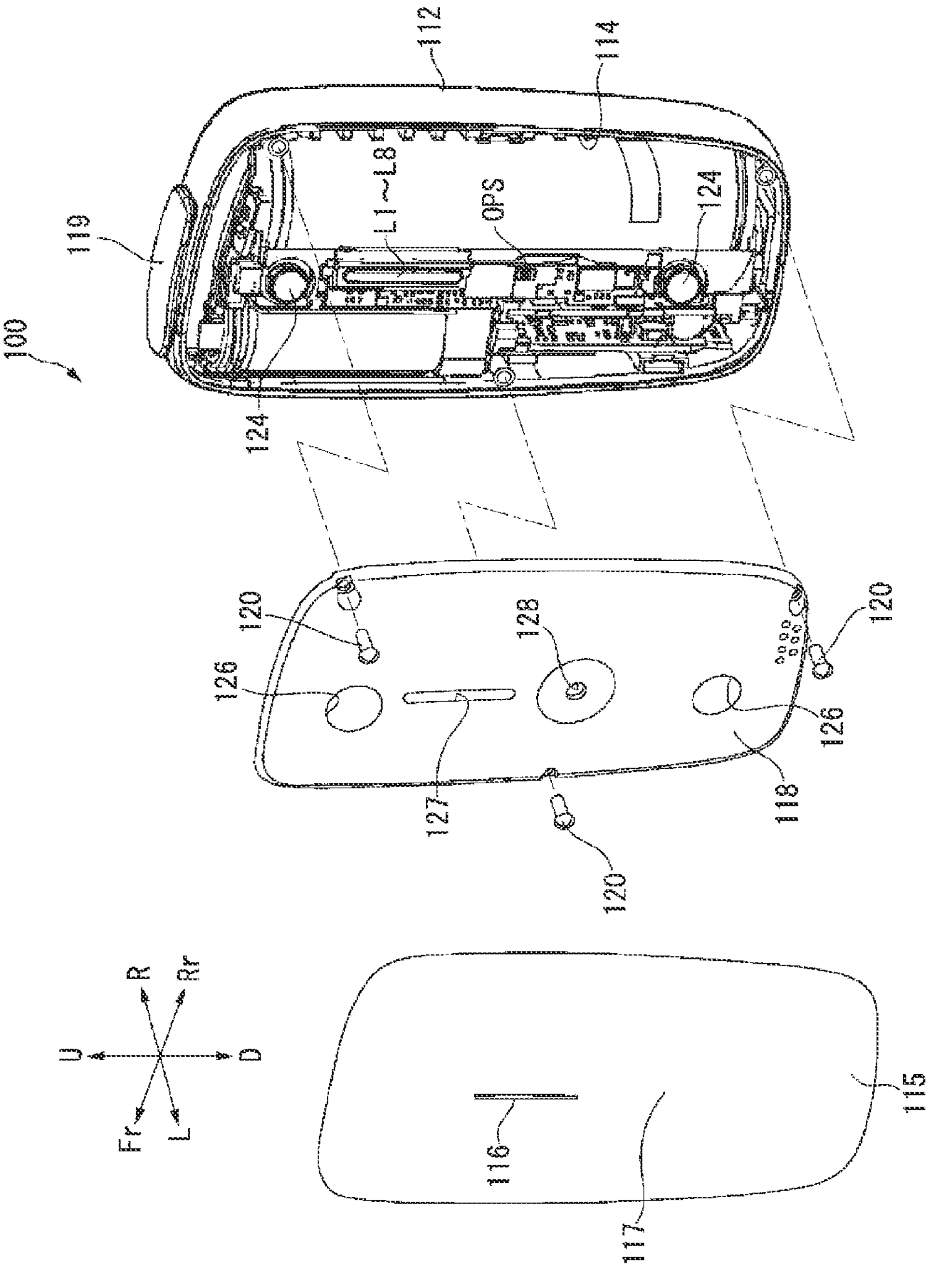
FIG. 4 is an exploded perspective view of the non-combustion inhaler.

FIG. 1 is a perspective view illustrating an overall configuration of the inhaler 100. FIG. 2 is a perspective view of the inhaler 100 with the rod 500 attached. FIG. 3 is another perspective view of the inhaler 100. FIG. 4 is an exploded perspective view of the inhaler 100. In addition, in the following description, for convenience, an orthogonal coordinate system in a three-dimensional space in which three directions orthogonal to one another are defined as a front-rear direction, a left-right direction, and an up-down direction will be described. In the drawings, a front side is denoted by Fr, a rear side is denoted by Rr, a right side is denoted by R, a left side is denoted by L, an upper side is denoted by U, and a lower side is denoted by D.

The inhaler 100 is configured to generate an aerosol containing a flavor by heating the rod 500 which is elongated and substantially columnar (see FIG. 2) as an example of a flavor component generation base material having a filler containing an aerosol source and a flavor source.

Flavor Component Generation Base Material (Rod)

The rod 500 includes a filler containing an aerosol source which is heated at a predetermined temperature to generate aerosol.

The type of the aerosol source is not particularly limited, and an extract substance from various natural products and/or a constituent component thereof can be selected according to a purpose. The aerosol source may be a solid, or may be, for example, a polyhydric alcohol such as glycerin or propylene glycol, or a liquid such as water. The aerosol source may include a flavor source such as a tobacco raw material which releases a flavor component by heating, or an extract originated from a tobacco raw material. The gas to which the flavor component is added is not limited to the aerosol, and for example, invisible steam may be generated.

The filler of the rod 500 may contain cut tobacco as the flavor source. A material of the cut tobacco is not specifically limited, and publicly known material such as a lamina and a stem may be used as the material. The filling article may contain one kind or two or more kinds of flavors. The kinds of flavors are not specifically limited, however, in view of provision of satisfactory smoke flavor, a flavor is menthol, preferably. The flavor source may contain plants other than tobacco(for example, mints, herbal medicines, or herbs). The rod 500 may not contain a flavor source depending on the purpose.

Overall Configuration of Non-combustion Inhaler

Next, an overall configuration of the inhaler 100 will be described with reference to FIGS. 1 to 4.

The inhaler 100 includes a substantially rectangular case 110 having a front surface, a rear surface, a left surface, a right surface, an upper surface, and a lower surface. The case 110 includes a bottomed tubular case main body 112 in which the front surface, the rear surface, the upper surface, the lower surface, and the right surface are integrally formed, an outer panel 115 and an inner panel 118 which seal an opening portion 114 (see FIG. 4) of the case main body 112 and constitute the left surface, and a slider 119.

The inner panel 118 is fixed to the case main body 112 by bolts 120. The outer panel 115 is fixed to the case main body 112 by magnets 124 held by a chassis 150 (see FIG. 5) to be described later accommodated in the case main body 112, so as to cover an outer surface of the inner panel 118. The outer panel 115 is fixed by the magnets 124, so that a user may replace the outer panel 115 as desired.

The inner panel 118 is provided with two through holes 126 through which the magnets 124 pass. The inner panel 118 is further provided with a vertically long hole 127 and a circular round hole 128 between the two through holes 126 disposed vertically. The long hole 127 is used to transmit light emitted from eight light emitting diodes (LEDs) L1 to L8 built in the case main body 112. A button-type operation switch OPS built in the case main body 112 passes through the round hole 128. Accordingly, the user can detect the light emitted from the eight LEDs L1 to L8 through a LED window 116 of the outer panel 115. In addition, the user can press down the operation switch OPS via a pressing portion 117 of the outer panel 115.

As illustrated in FIG. 2, an opening 132 into which the rod 500 may be inserted is provided in the upper surface of the case main body 112. The slider 119 is coupled to the case main body 112 between a position where the opening 132 is closed (see FIG. 1) and a position where the opening 132 is opened (see FIG. 2), so as to be movable in the front-rear direction.

The operation switch OPS is used to perform various operations of the inhaler 100. For example, the user operates the operation switch OPS via the pressing portion 117 in a state where the rod 500 is inserted into the opening 132 and mounted as illustrated in FIG. 2. Accordingly, the rod 500 is heated by the heating unit 170 (see FIG. 5) without combustion. When the rod 500 is heated, aerosol is generated from the aerosol source contained in the rod 500, and the flavor of the flavor source contained in the rod 500 is added to the aerosol. The user can inhale the aerosol containing the flavor by holding in the mouth an inhaling port 502 of the rod 500 protruding from the opening 132 to perform inhaling.

As illustrated in FIG. 3, a charging terminal 134 which is electrically connected to an external power supply such as an outlet or a mobile battery and receives supply of power is provided on the lower surface of the case main body 112. In the present embodiment, the charging terminal 134 is a universal serial bus (USB) Type-C receptacle, but is not limited thereto. The charging terminal 134 is hereinafter also referred to as a receptacle RCP.

The charging terminal 134 may include, for example, a power receiving coil, and may receive power transmitted from the external power supply in a non-contact manner. A method of wireless power transfer in this case may be an electromagnetic induction type, a magnetic resonance type, or a combination of the electromagnetic induction type and the magnetic resonance type. As another example, the charging terminal 134 may be connectable to various USB terminals or the like, and may include the above-described power receiving coil.

A configuration of the inhaler 100 illustrated in FIGS. 1 to 4 is merely an example. The inhaler 100 can be configured in various forms in which the rod 500 is held and applied with an action such as heating to generate a gas to which a flavor component is added from the rod 500, and a user can inhale the generated gas.

<Internal Configuration of Non-Combustion Inhaler>

An internal unit 140 of the inhaler 100 will be described with reference to FIGS. 5 to 8.

Figure 5:
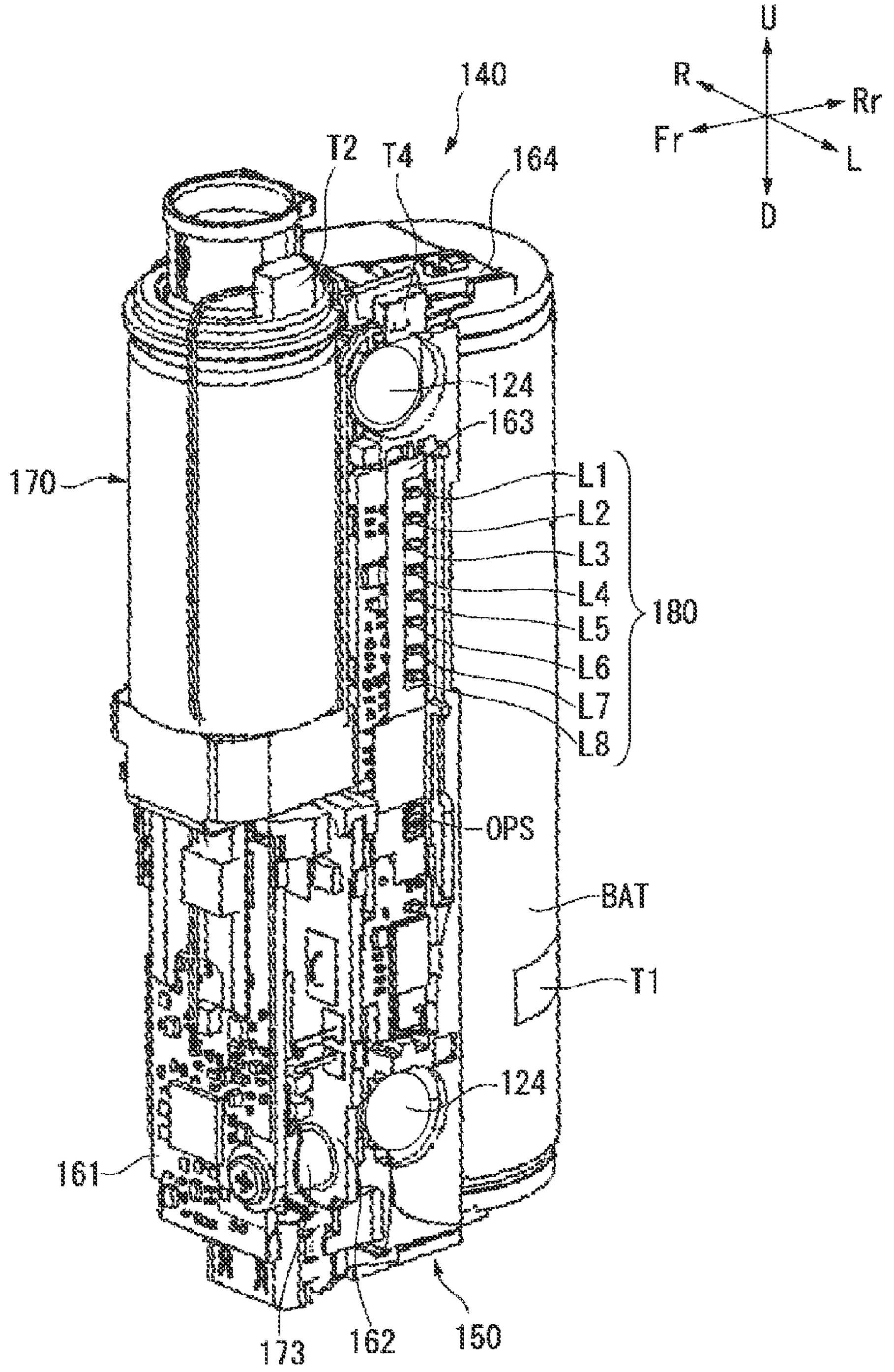
FIG. 5 is a perspective view of an internal unit of the non-combustion inhaler.
Figure 6:
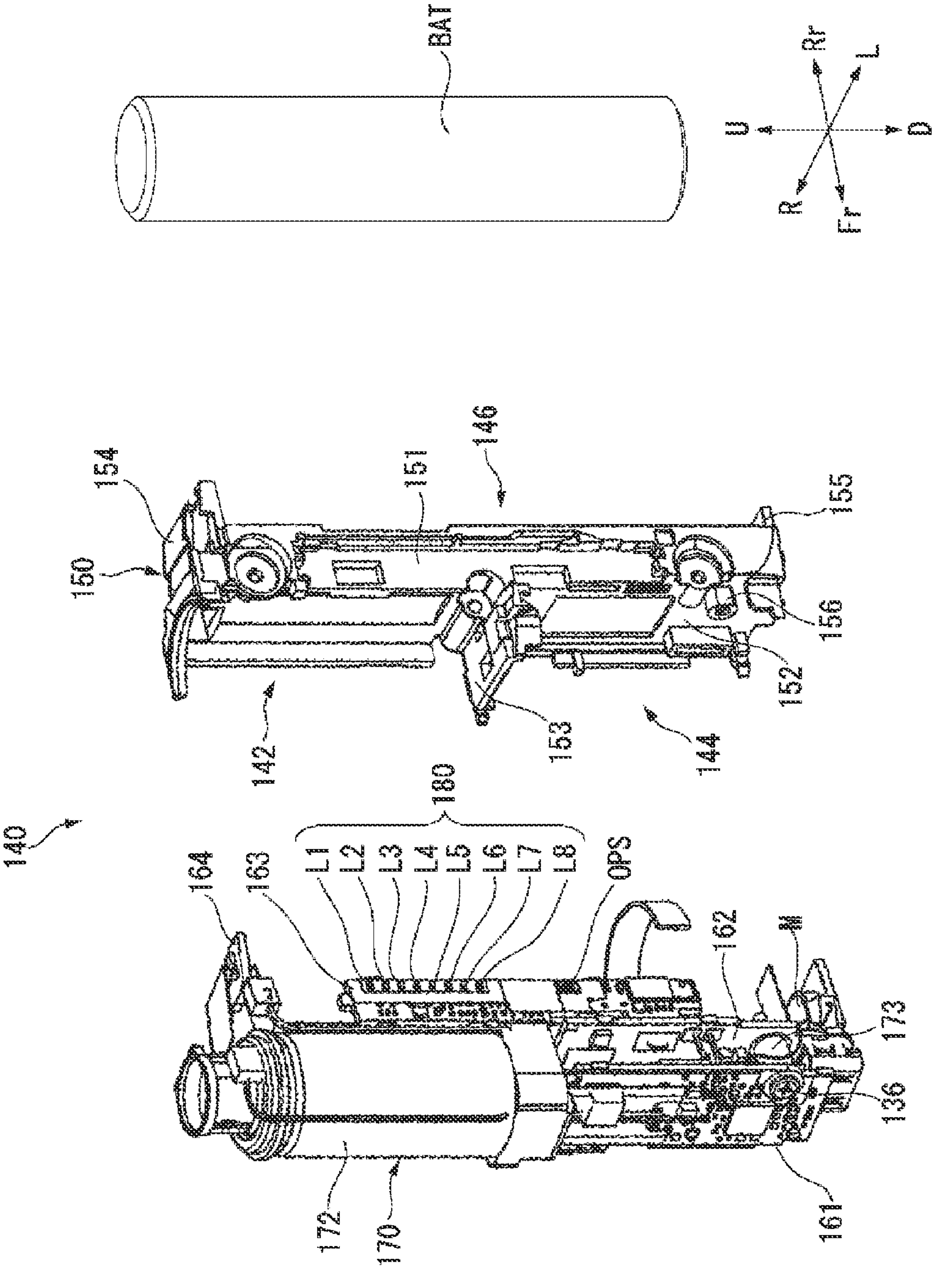
FIG. 6 is an exploded perspective view of the internal unit in FIG. 5.
Figure 7:
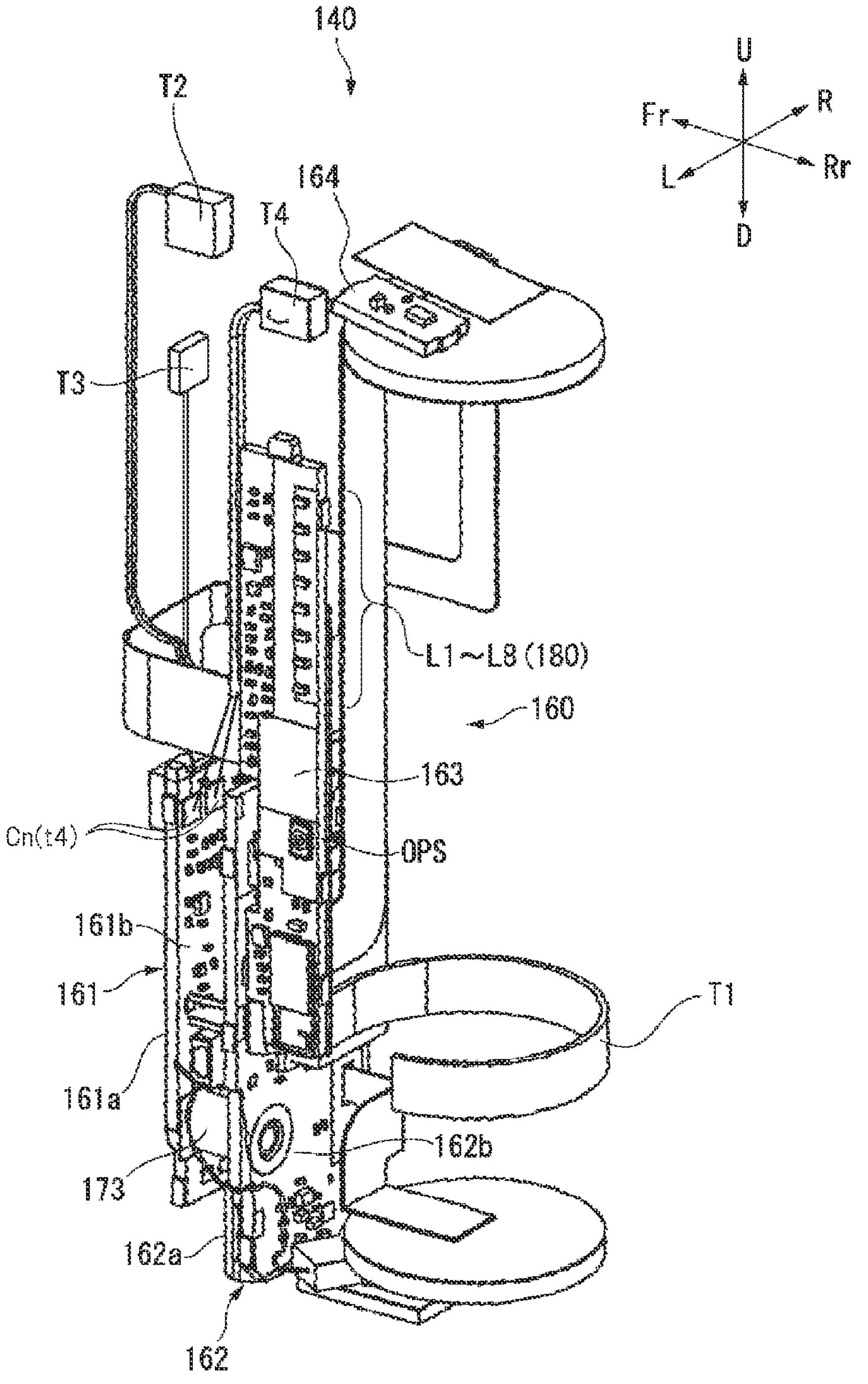
FIG. 7 is a perspective view of the internal unit with a power supply and a chassis removed.
Figure 8:
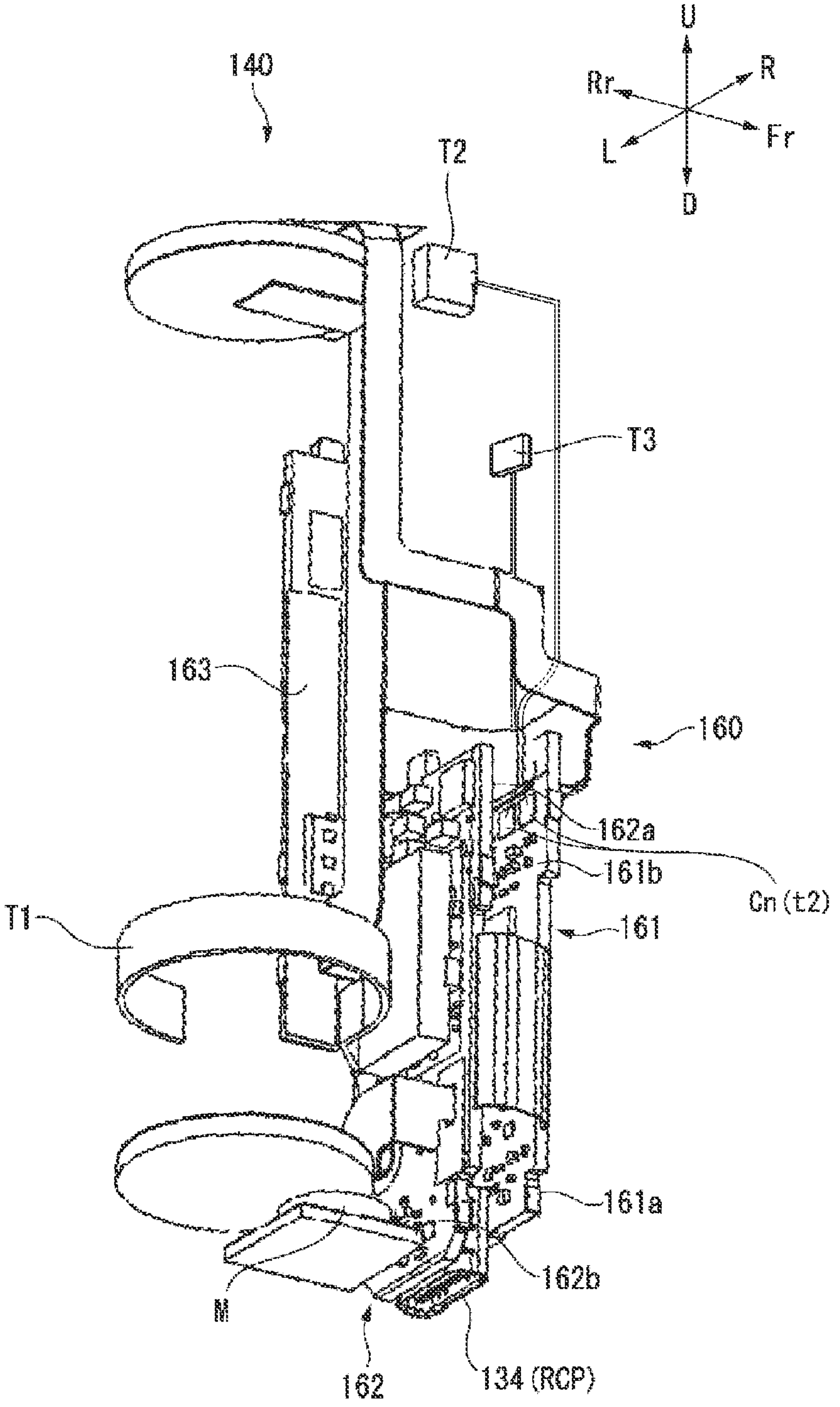
FIG. 8 is another perspective view of the internal unit with the power supply and the chassis removed.

FIG. 5 is a perspective view of the internal unit 140 of the inhaler 100. FIG. 6 is an exploded perspective view of the internal unit 140 in FIG. 5. FIG. 7 is a perspective view of the internal unit 140 from which a power supply BAT and the chassis 150 are removed. FIG. 8 is another perspective view of the internal unit 140 from which the power supply BAT and the chassis 150 are removed.

The internal unit 140 accommodated in an internal space of the case 110 includes the chassis 150, the power supply BAT, a circuit unit 160, a heating unit 170, a notification unit 180, and various sensors.

The chassis 150 includes a plate-shaped chassis main body 151 which is disposed substantially in a center of the internal space of the case 110 in the front-rear direction and which extends in the up-down direction and the front-rear direction, a plate-shaped front-rear dividing wall 152 which is disposed substantially in the center of the internal space of the case 110 in the front-rear direction and which extends in the up-down direction and the left-right direction, a plate-shaped up-down dividing wall 153 which extends forward from substantially a center of the front-rear dividing wall 152 in the up-down direction, a plate-shaped chassis upper wall 154 which extends rearward from upper edge portions of the front-rear dividing wall 152 and the chassis main body 151, and a plate-shaped chassis lower wall 155 which extends rearward from lower edge portions of the front-rear dividing wall 152 and the chassis main body 151. A left surface of the chassis main body 151 is covered with the inner panel 118 and the outer panel 115 of the case 110 described above.

By the chassis 150, a heating unit accommodation region 142 is defined and formed in an upper front portion of the internal space of the case 110, a board accommodation region 144 is defined and formed in a lower front portion thereof, and a power supply accommodation space 146 is defined and formed in a rear portion thereof over the up-down direction.

The heating unit 170 accommodated in the heating unit accommodation region 142 is constituted by a plurality of tubular members, and the tubular members are concentrically disposed to form a tubular body as a whole. The heating unit 170 includes a rod accommodation portion 172 capable of accommodating a part of the rod 500 therein, and a heater HTR (see FIGS. 10 to 19) which heats the rod 500 from an outer periphery or a center. It is preferable that a surface of the rod accommodation portion 172 and the heater HTR are thermally insulated by forming the rod accommodation portion 172 with a heat insulating material or providing a heat insulating material inside the rod accommodation portion 172. The heater HTR may be an element capable of heating the rod 500. The heater HTR is, for example, a heating element. Examples of the heating element include a heating resistor, a ceramic heater, and an induction-heating-type heater. As the heater HTR, for example, a heater having a positive temperature coefficient (PTC) characteristic in which a resistance value increases with an increase in temperature is preferably used. Alternatively, a heater HTR having a negative temperature coefficient (NTC) characteristic in which the resistance value decreases with an increase in temperature may be used. The heating unit 170 has a function of defining a flow path of air supplied to the rod 500 and a function of heating the rod 500. The case 110 is formed with a vent hole (not illustrated) for allowing air to flow in so that air can flow into the heating unit 170.

The power supply BAT accommodated in the power supply accommodation space 146 is a rechargeable secondary battery, an electric double layer capacitor, or the like, and is preferably a lithium ion secondary battery. An electrolyte of the power supply BAT may be constituted by one or a combination of a gel electrolyte, an electrolytic solution, a solid electrolyte, and an ionic liquid.

The notification unit 180 notifies various types of information such as a state of charge (SOC) indicating a charging state of the power supply BAT, a preheating time at the time of inhaling, and an inhaling available period. The notification unit 180 according to the present embodiment includes the eight LEDs L1 to L8 and a vibration motor M. The notification unit 180 may be constituted by a light emitting element such as the LEDs L1 to L8, a vibration element such as the vibration motor M, or a sound output element. The notification unit 180 may be a combination of two or more elements among a light emitting element, a vibration element, and a sound output element.

The various sensors include an intake sensor which detects a puff operation (inhaling operation) of the user, a power supply temperature sensor which detects a temperature of the power supply BAT, a heater temperature sensor which detects a temperature of the heater HTR, a case temperature sensor which detects a temperature of the case 110, a cover position sensor which detects a position of the slider 119, a panel detection sensor which detects attachment and detachment of the outer panel 115, and the like.

The intake sensor mainly includes, for example, a thermistor T2 disposed in the vicinity of the opening 132. The power supply temperature sensor mainly includes, for example, a thermistor T1 disposed in the vicinity of the power supply BAT. The heater temperature sensor mainly includes, for example, a thermistor T3 disposed in the vicinity of the heater HTR. As described above, the rod accommodation portion 172 is preferably thermally insulated from the heater HTR. In this case, the thermistor T3 is preferably in contact with or close to the heater HTR inside the rod accommodation portion 172. When the heater HTR has the PTC characteristic or the NTC characteristic, the heater HTR may be used for the heater temperature sensor. The case temperature sensor mainly includes, for example, a thermistor T4 disposed in the vicinity of the left surface of the case 110. The cover position sensor mainly includes a Hall IC 14 including a Hall element disposed in the vicinity of the slider 119. The panel detection sensor mainly includes a Hall IC 13 including a Hall element disposed in the vicinity of an inner surface of the inner panel 118.

The circuit unit 160 includes four circuit boards, a plurality of integrate circuits (ICs), and a plurality of elements. The four circuit boards include an MCU-mounted board 161 to be described later on which a micro controller unit (MCU) 1 and a charging IC 2 are mainly disposed, a receptacle-mounted board 162 on which the charging terminal 134 is mainly disposed, an LED-mounted board 163 on which the operation switch OPS, the LEDs L1 to L8, and a communication IC 15 to be described later are disposed, and a Hall IC-mounted board 164 on which the Hall IC 14 to be described later including a Hall element constituting the cover position sensor is disposed.

The MCU-mounted board 161 and the receptacle-mounted board 162 are disposed in parallel with each other in the board accommodation region 144. Specifically, the MCU-mounted board 161 and the receptacle-mounted board 162 are disposed such that element disposition surfaces thereof extend in the left-right direction and the up-down direction, and the MCU-mounted board 161 is disposed in front of the receptacle-mounted board 162. Each of the MCU-mounted board 161 and the receptacle-mounted board 162 is provided with an opening portion. The MCU-mounted board 161 and the receptacle-mounted board 162 are fastened, by a bolt 136, to a board fixing portion 156 of the front-rear dividing wall 152 in a state where a cylindrical spacer 173 is interposed between peripheral portions of the respective opening portions. That is, the spacer 173 fixes positions of the MCU-mounted board 161 and the receptacle-mounted board 162 inside the case 110, and mechanically connects the MCU-mounted board 161 and the receptacle-mounted board 162. Accordingly, the MCU-mounted board 161 and the receptacle-mounted board 162 come into contact with each other, and it is possible to prevent the occurrence of a short-circuit current therebetween.

For convenience, assuming that the surfaces of the MCU-mounted board 161 and the receptacle-mounted board 162 facing the front are main surfaces 161*a* and 162*a*, respectively, and surfaces opposite to the main surfaces 161*a* and 162*a* are secondary surfaces 161*b* and 162*b*, respectively, the secondary surface 161*b* of the MCU-mounted board 161 and the main surface 162*a* of the receptacle-mounted board 162 face each other with a predetermined gap therebetween. The main surface 161*a* of the MCU-mounted board 161 faces the front surface of the case 110, and the secondary surface 162*b* of the receptacle-mounted board 162 faces the front-rear dividing wall 152 of the chassis 150. Elements and ICs mounted on the MCU-mounted board 161 and the receptacle-mounted board 162 will be described later.

The LED-mounted board 163 is disposed on a left side surface of the chassis main body 151 and between the two magnets 124 disposed vertically. An element disposition surface of the LED-mounted board 163 is disposed along the up-down direction and the front-rear direction. In other words, element disposition surfaces of the MCU-mounted board 161 and the receptacle-mounted board 162 are orthogonal to the element disposition surface of the LED-mounted board 163. In this way, the element disposition surfaces of the MCU-mounted board 161 and the receptacle-mounted board 162 and the element disposition surface of the LED-mounted board 163 are not limited to being orthogonal to one another, and preferably intersect with one another (not parallel with one another). The vibration motor M constituting the notification unit 180 together with the LEDs L1 to L8 is fixed to a lower surface of the chassis lower wall 155 and is electrically connected to the MCU-mounted board 161.

The Hall IC-mounted board 164 is disposed on the upper surface of the chassis upper wall 154.

<Operation Modes of Inhaler>

Figure 9:
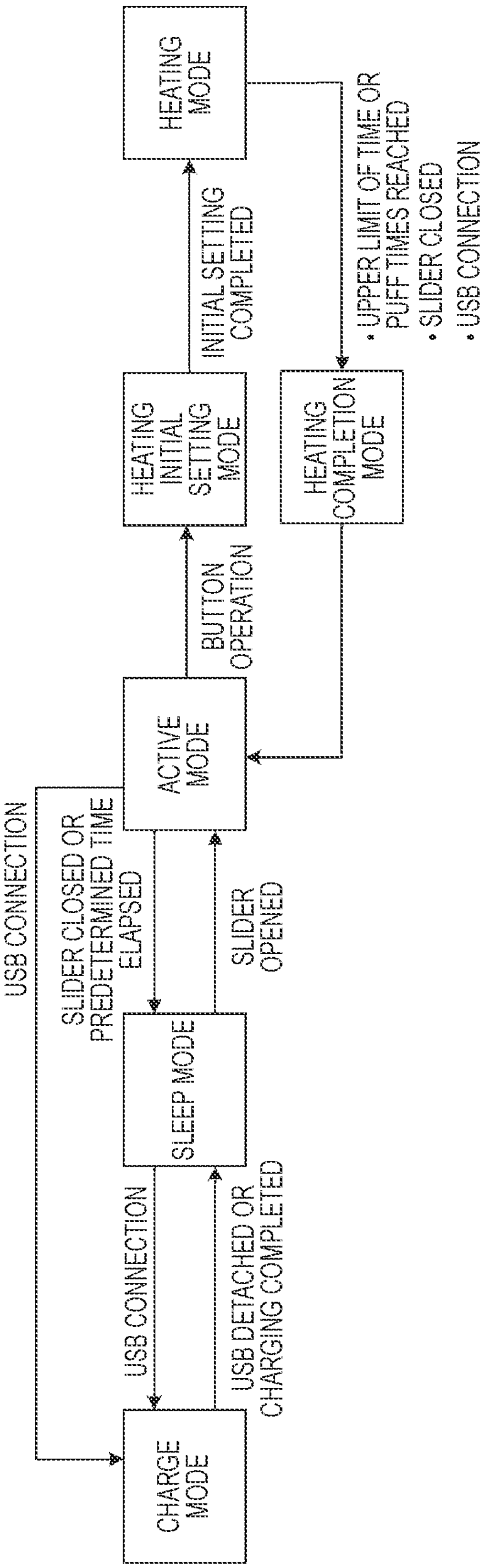
FIG. 9 is a schematic diagram for illustrating operation modes of the inhaler.

FIG. 9 is a schematic diagram for illustrating operation modes of the inhaler 100. As illustrated in FIG. 9, the operation modes of the inhaler 100 include a charging mode, a sleep mode, an active mode, a heating initial setting mode, a heating mode, and a heating completion mode.

The sleep mode is a mode in which supply of power to electronic components mainly required for heating control of the heater HTR is stopped to save power.

The active mode is a mode in which most of the functions excluding the heating control of the heater HTR are enabled. The inhaler 100 switches the operation mode to the active mode when the slider 119 is opened in a state of operating in the sleep mode. The inhaler 100 switches the operation mode to the sleep mode when the slider 119 is closed or a non-operation time of the operation switch OPS reaches a predetermined time in a state of operating in the active mode.

The heating initial setting mode is a mode for performing initial setting of control parameters and the like for starting the heating control of the heater HTR. The inhaler 100 switches the operation mode to the heating initial setting mode when the operation of the operation switch OPS is detected in a state of operating in the active mode, and switches the operation mode to the heating mode when the initial setting is completed.

The heating mode is a mode in which the heating control of the heater HTR (heating control for aerosol generating and heating control for temperature detection) is executed. The inhaler 100 starts the heating control of the heater HTR when the operation mode is switched to the heating mode.

The heating completion mode is a mode in which a completion process (storage process of heating history or the like) of the heating control of the heater HTR is executed. The inhaler 100 switches the operation mode to the heating completion mode when an energization time to the heater HTR or the number of times of inhaling by the user reaches an upper limit or the slider 119 is closed in a state of operating in the heating mode, and switches the operation mode to the active mode when the completion process is completed. The inhaler 100 switches the operation mode to the heating completion mode when a USB connection is established in a state of operating in the heating mode, and switches the operation mode to the charging mode when the completion process is completed. As illustrated in FIG. 9, in this case, the operation mode may be switched to the active mode before the operation mode is switched to the charging mode. In other words, the inhaler 100 may switch the operation mode in the order of the heating completion mode, the active mode, and the charging mode when the USB connection is established in a state of operating in the heating mode.

The charging mode is a mode in which the power supply BAT is charged by power supplied from the external power supply connected to the receptacle RCP. The inhaler 100 switches the operation mode to the charging mode when an external power supply is connected (USB connected) to the receptacle RCP in a state of operating in the sleep mode or the active mode. The inhaler 100 switches the operation mode to the sleep mode when the charging of the power supply BAT is completed or the connection between the receptacle RCP and the external power supply is released in a state of operating in the charging mode.

<Outline of Circuit of Internal Unit>

Figure 10:
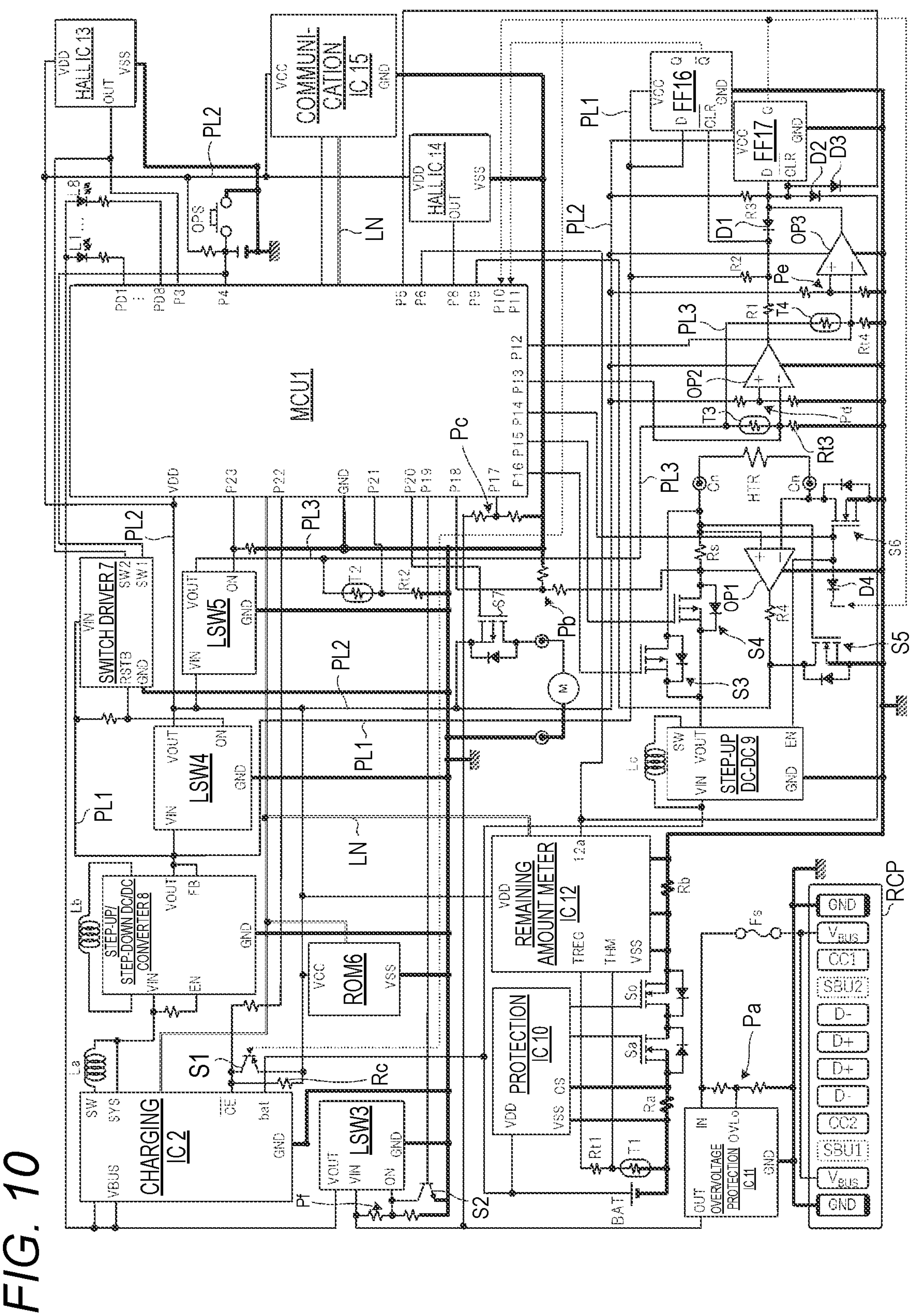
FIG. 10 is a diagram illustrating a schematic configuration of an electric circuit of the internal unit.
Figure 11:
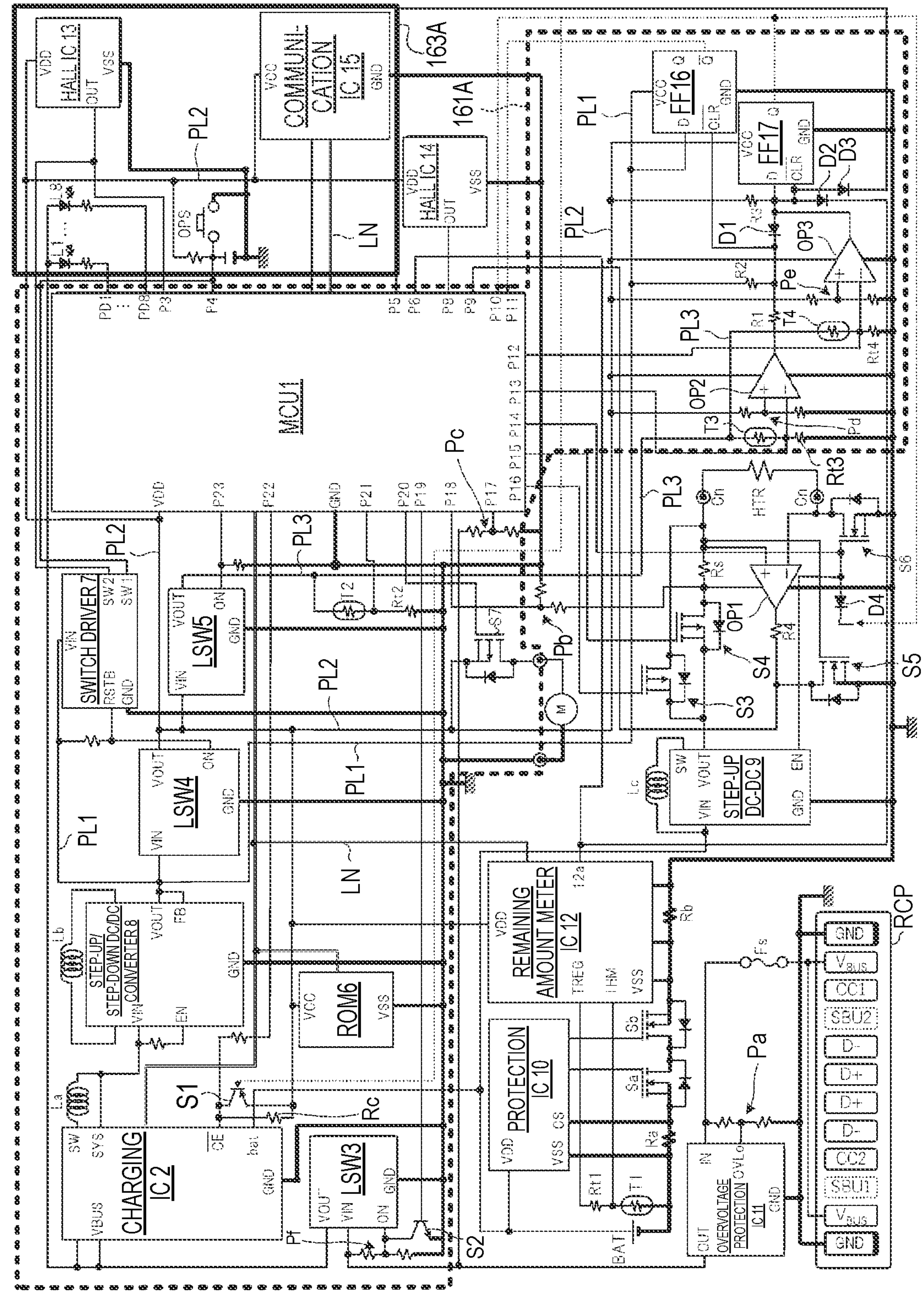
FIG. 11 is a diagram illustrating a schematic configuration of the electric circuit of the internal unit.
Figure 12:
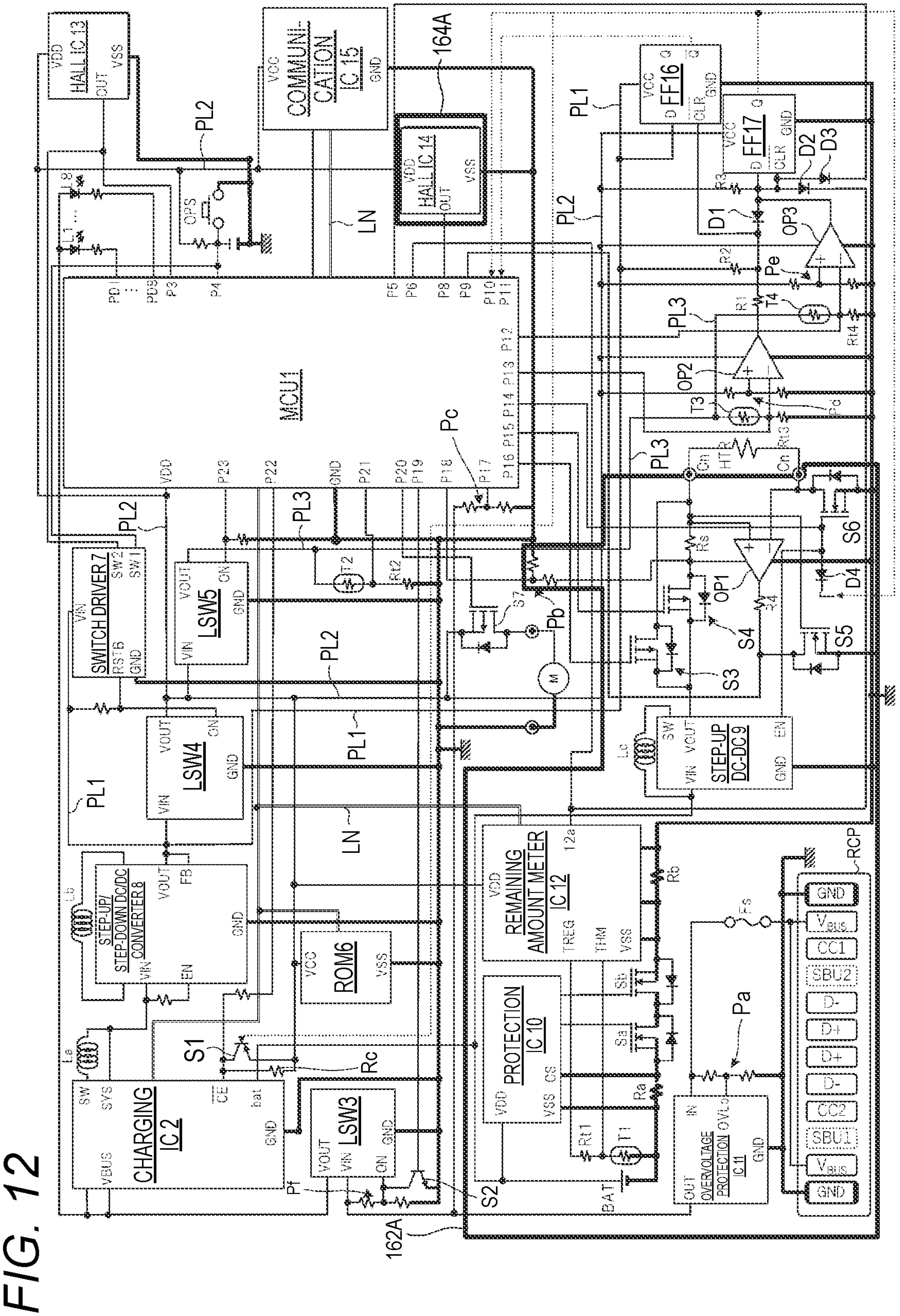
FIG. 12 is a diagram illustrating a schematic configuration of the electric circuit of the internal unit.

FIGS. 10, 11, and 12 are diagrams illustrating a schematic configuration of an electric circuit of the internal unit 140. FIG. 11 is the same as FIG. 10 except that a range 161A (range surrounded by a thick broken line) mounted on the MCU-mounted board 161 and a range 163A (range surrounded by a thick solid line) mounted on the LED-mounted board 163 are added in the electric circuit illustrated in FIG. 10. FIG. 12 is the same as FIG. 10 except that a range 162A mounted on the receptacle-mounted board 162 and a range 164A mounted on the Hall IC-mounted board 164 are added in the electric circuit illustrated in FIG. 10.

A wiring indicated by a thick solid line in FIG. 10 is a wiring having the same potential as a reference potential (ground potential) of the internal unit 140 (wiring connected to a ground provided in the internal unit 140), and this wiring is hereinafter referred to as a ground line. In FIG. 10, an electronic component in which a plurality of circuit elements are formed into a chip is indicated by a rectangle, and reference numerals of various terminals are described inside the rectangle. A power supply terminal VCC and a power supply terminal VDD mounted on the chip each indicate a power supply terminal on a high potential side. A power supply terminal VSS and a ground terminal GND mounted on the chip each indicate a power supply terminal on a low potential side (reference potential side). In the electronic component formed into a chip, a difference between a potential of the power supply terminal on the high potential side and a potential of the power supply terminal on the low potential side becomes a power supply voltage. The electronic component formed into a chip executes various functions using the power supply voltage.

As illustrated in FIG. 11, the MCU-mounted board 161 (range 161A) is provided with, as main electronic components, the MCU 1 which performs overall control of the inhaler 100, the charging IC 2 which performs charging control of the power supply BAT, load switches (hereinafter, LSW) 3, 4, and 5 configured by combining a capacitor, a resistor, a transistor, and the like, a read only memory (ROM) 6, a switch driver 7, a step-up/step-down DC/DC converter 8 (described as step-up/step-down DC/DC 8 in the drawing), an operational amplifier OP2, an operational amplifier OP3, flip-flops (hereinafter, FF) 16 and 17, a connector Cn (t2) electrically connected to the thermistor T2 constituting the intake sensor (described as the thermistor T2 connected to the connector in the drawing), a connector Cn (t3) electrically connected to the thermistor T3 constituting the heater temperature sensor (described as the thermistor T3 connected to the connector in the drawing), a connector Cn (t4) electrically connected to the thermistor T4 constituting the case temperature sensor (described as the thermistor T4 connected to the connector in the drawing), and a voltage divider circuit Pc for USB connection detection.

The ground terminal GND of each of the charging IC 2, LSW 3, LSW 4, LSW 5, the switch driver 7, the step-up/step-down DC/DC converter 8, the FF 16, and the FF 17 is connected to the ground line. The power supply terminal VSS of the ROM 6 is connected to the ground line. Negative power supply terminals of the operational amplifiers OP2 and the operational amplifier OP3 are connected to the ground line.

As illustrated in FIG. 11, the LED-mounted board 163 (range 163A) is provided with, as main electronic components, the Hall IC 13 including the Hall element constituting the panel detection sensor, the LEDs L1 to L8, the operation switch OPS, and the communication IC 15. The communication IC 15 is a communication module for communicating with an electronic device such as a smartphone. Each of the power supply terminal VSS of the Hall IC 13 and the ground terminal GND of the communication IC 15 is connected to the ground line. The communication IC 15 and the MCU 1 can communicate with each other via a communication line LN. One end of the operation switch OPS is connected to the ground line, and the other end of the operation switch OPS is connected to a terminal P4 of the MCU 1.

As illustrated in FIG. 12, the receptacle-mounted board 162 (range 162A) is provided with, as main electronic components, a power supply connector electrically connected to the power supply BAT (described as the power supply BAT connected to the power supply connector in the drawing), a connector electrically connected to the thermistor T1 constituting the power supply temperature sensor (described as the thermistor T1 connected to the connector in the drawing), the step-up DC/DC converter 9 (described as the step-up DC/DC 9 in the drawing), a protection IC 10, an overvoltage protection IC 11, a remaining amount meter IC 12, the receptacle RCP, the switch S3 to the switch S6 each constituted by a MOSFET, the operational amplifier OP1, and a pair of heater connectors Cn (positive electrode side and negative electrode side) electrically connected to the heater HTR.

The two ground terminals GND of the receptacle RCP, the ground terminal GND of the step-up DC/DC converter 9, the power supply terminal VSS of the protection IC 10, the power supply terminal VSS of the remaining amount meter IC 12, the ground terminal GND of the overvoltage protection IC 11, and the negative power supply terminal of the operational amplifier OP1 are each connected to the ground line.

As illustrated in FIG. 12, the Hall IC-mounted board 164 (range 164A) is provided with the Hall IC 14 including the Hall element constituting the cover position sensor. The power supply terminal VSS of the Hall IC 14 is connected to the ground line. An output terminal OUT of the Hall IC 14 is connected to a terminal P8 of the MCU 1. The MCU 1 detects opening and closing of the slider 119 based on a signal input to the terminal P8.

As illustrated in FIG. 11, a connector electrically connected to the vibration motor M is provided on the MCU-mounted board 161.

Details of Circuit of Internal Unit

A connection relation among the electronic components will be described below with reference to FIG. 10.

Two power supply input terminals $V_{BUS}$ of the receptacle RCP are each connected to an input terminal IN of the overvoltage protection IC 11 via a fuse Fs. When a USB plug is connected to the receptacle RCP and a USB cable including the USB plug is connected to an external power supply, a USB voltage $V_{USB}$ is supplied to the two power supply input terminals $V_{BUS}$ of the receptacle RCP.

One end of a voltage divider circuit Pa including a series circuit of two resistors is connected to the input terminal IN of the overvoltage protection IC 11. The other end of the voltage divider circuit Pa is connected to the ground line. A connection point of the two resistors constituting the voltage divider circuit Pa is connected to a voltage detection terminal OVLo of the overvoltage protection IC 11. In a state where a voltage input to the voltage detection terminal OVLo is less than a threshold, the overvoltage protection IC 11 outputs the voltage input to the input terminal IN from the output terminal OUT. When the voltage input to the voltage detection terminal OVLo is equal to or higher than a threshold (overvoltage), the overvoltage protection IC 11 stops the voltage output from the output terminal OUT (cuts off an electrical connection between the LSW 3 and the receptacle RCP) to protect the electronic components downstream of the overvoltage protection IC 11. The output terminal OUT of the overvoltage protection IC 11 is connected to an input terminal VIN of the LSW 3 and one end of the voltage divider circuit Pc (series circuit of two resistors) connected to the MCU 1. The other end of the voltage divider circuit Pc is connected to the ground line. A connection point of the two resistors constituting the voltage divider circuit Pc is connected to a terminal P17 of the MCU 1.

One end of a voltage divider circuit Pf including a series circuit of two resistors is connected to the input terminal VIN of the LSW 3. The other end of the voltage divider circuit Pf is connected to the ground line. A connection point of the two resistors constituting the voltage divider circuit Pf is connected to a control terminal ON of the LSW 3. A collector terminal of a bipolar transistor S2 is connected to the control terminal ON of the LSW 3. An emitter terminal of the bipolar transistor S2 is connected to the ground line. A base terminal of the bipolar transistor S2 is connected to a terminal P19 of the MCU 1. The LSW 3 outputs a voltage input to the input terminal VIN from an output terminal VOUT when a signal input to the control terminal ON becomes a high level. The output terminal VOUT of the LSW 3 is connected to an input terminal VBUS of the charging IC 2. The MCU 1 turns on the bipolar transistor S2 while the USB connection is not established. Accordingly, since the control terminal ON of the LSW 3 is connected to the ground line via the bipolar transistor S2, a low-level signal is input to the control terminal ON of the LSW 3.

The bipolar transistor S2 connected to the LSW 3 is turned off by the MCU 1 when the USB connection is established. By turning off the bipolar transistor S2, the USB voltage $V_{USB}$ divided by the voltage divider circuit Pf is input to the control terminal ON of the LSW 3. Therefore, when the USB connection is established and the bipolar transistor S2 is turned off, a high-level signal is input to the control terminal ON of the LSW 3. Accordingly, the LSW 3 outputs, from the output terminal VOUT, the USB voltage $V_{USB}$ supplied from the USB cable. Even when the USB connection is established in a state where the bipolar transistor S2 is not turned off, the control terminal ON of the LSW 3 is connected to the ground line via the bipolar transistor S2. Therefore, it should be noted that a low-level signal continues to be input to the control terminal ON of the LSW 3 unless the MCU 1 turns off the bipolar transistor S2.

A positive electrode terminal of the power supply BAT is connected to the power supply terminal VDD of the protection IC 10, an input terminal VIN of the step-up DC/DC converter 9, and a charging terminal bat of the charging IC 2. Therefore, the power supply voltage $V_{BAT}$ of the power supply BAT is supplied to the protection IC 10, the charging IC 2, and the step-up DC/DC converter 9. A resistor Ra, a switch Sa constituted by a MOSFET, a switch Sb constituted by a MOSFET, and a resistor Rb are connected in series to a negative electrode terminal of the power supply BAT in this order. A current detection terminal CS of the protection IC 10 is connected to a connection point between the resistor Ra and the switch Sa. Each of control terminals of the switch Sa and the switch Sb is connected to the protection IC 10. Both ends of the resistor Rb are connected to the remaining amount meter IC 12.

The protection IC 10 acquires a current value flowing through the resistor Ra during charging and discharging of the power supply BAT from the voltage input to the current detection terminal CS, and when the current value becomes excessively large (overcurrent), performs opening and closing control of the switch Sa and the switch Sb to stop charging or discharging of the power supply BAT, thereby protecting the power supply BAT. More specifically, when an excessively large current value is acquired at the time of charging the power supply BAT, the protection IC 10 turns off the switch Sb to stop the charging of the power supply BAT. When an excessively large current value is acquired at the time of discharging the power supply BAT, the protection IC 10 turns off the switch Sa to stop the discharging of the power supply BAT. In addition, when a voltage value of the power supply BAT becomes abnormal based on the voltage input to the power supply terminal VDD (in a case of overcharge or overvoltage), the protection IC 10 performs opening and closing control of the switch Sa and the switch Sb to stop charging or discharging of the power supply BAT, thereby protecting the power supply BAT. More specifically, when the overcharge of the power supply BAT is detected, the protection IC 10 turns off the switch Sb to stop the charging of the power supply BAT. When the overdischarge of the power supply BAT is detected, the protection IC 10 turns off the switch Sa to stop the discharging of the power supply BAT.

A resistor Rt1 is connected to the connector which is connected to the thermistor T1 disposed in the vicinity of the power supply BAT. A series circuit of the resistor Rt1 and the thermistor T1 is connected to the ground line and a regulator terminal TREG of the remaining amount meter IC 12. A connection point between the thermistor T1 and the resistor Rt1 is connected to a thermistor terminal THM of the remaining amount meter IC 12. The thermistor T1 may be a positive temperature coefficient (PTC) thermistor whose resistance value increases as the temperature increases, or may be a negative temperature coefficient (NTC) thermistor whose resistance value decreases as the temperature increases.

The remaining amount meter IC 12 detects a current flowing through the resistor Rb and derives battery information such as a remaining capacity of the power supply BAT, a state of charge (SOC) indicating a charging state, and a state of health (SOH) indicating a health state based on the detected current value. The remaining amount meter IC 12 supplies a voltage from a built-in regulator connected to the regulator terminal TREG to a voltage divider circuit of the thermistor T1 and the resistor Rt1. The remaining amount meter IC 12 acquires a voltage divided by the voltage divider circuit from the thermistor terminal THM, and acquires temperature information related to the temperature of the power supply BAT based on the voltage. The remaining amount meter IC 12 is connected to the MCU 1 via the communication line LN for serial communication, and is configured to be able to communicate with the MCU 1. The remaining amount meter IC 12 transmits the derived battery information and the acquired temperature information of the power supply BAT to the MCU 1 in response to a request from the MCU 1. A plurality of signal lines such as a data line for data transmission and a clock line for synchronization are required to perform serial communication. It should be noted that only one signal line is illustrated in FIGS. 10 to 19 for simplification.

The remaining amount meter IC 12 includes a notification terminal 12*a*. The notification terminal 12*a* is connected to a terminal P6 of the MCU 1 and a cathode of a diode D2 to be described later. When an abnormality such as an excessively high temperature of the power supply BAT is detected, the remaining amount meter IC 12 outputs a low-level signal from the notification terminal 12*a* to notify the MCU 1 of the occurrence of the abnormality. The low-level signal is also input to a CLR(—) terminal of the FF 17 via the diode D2.

One end of a reactor Lc is connected to a switching terminal SW of the step-up DC/DC converter 9. The other end of the reactor Lc is connected to the input terminal VIN of the step-up DC/DC converter 9. The step-up DC/DC converter 9 performs ON/OFF control of a built-in transistor connected to the switching terminal SW, thereby stepping up an input voltage and outputting the stepped-up voltage from an output terminal VOUT thereof. The input terminal VIN of the step-up DC/DC converter 9 constitutes a power supply terminal of the step-up DC/DC converter 9 on a high potential side. The step-up DC/DC converter 9 performs a step-up operation when a signal input to an enable terminal EN is at a high level. In the USB-connected state, the signal input to the enable terminal EN of the step-up DC/DC converter 9 may be controlled to a low level by the MCU 1. Alternatively, in the USB-connected state, the MCU 1 may not control the signal input to the enable terminal EN of the step-up DC/DC converter 9 to make a potential of the enable terminal EN unstable.

A source terminal of a switch S4 constituted by a P-channel MOSFET is connected to the output terminal VOUT of the step-up DC/DC converter 9. A gate terminal of the switch S4 is connected to a terminal P15 of the MCU 1. One end of a resistor Rs is connected to a drain terminal of the switch S4. The other end of the resistor Rs is connected to the heater connector Cn on the positive electrode side connected to one end of the heater HTR. A voltage divider circuit Pb including two resistors is connected to a connection point between the switch S4 and the resistor Rs. A connection point of the two resistors constituting the voltage divider circuit Pb is connected to a terminal P18 of the MCU 1. A connection point between the switch S4 and the resistor Rs is further connected to a positive power supply terminal of the operational amplifier OP1.

A connection line between the output terminal VOUT of the step-up DC/DC converter 9 and the source terminal of the switch S4 is connected to a source terminal of the switch S3 constituted by a P-channel MOSFET. A gate terminal of the switch S3 is connected to the terminal P16 of the MCU 1. A drain terminal of the switch S3 is connected to a connection line between the resistor Rs and the heater connector Cn on the positive electrode side. In this way, a circuit including the switch S3 and a circuit including the switch S4 and the resistor Rs are connected in parallel between the output terminal VOUT of the step-up DC/DC converter 9 and the positive electrode side of the heater connector Cn. The circuit including the switch S3 does not include a resistor, and thus is a circuit having a lower resistance than the circuit including the switch S4 and the resistor Rs.

A non-inverting input terminal of the operational amplifier OP1 is connected to the connection line between the resistor Rs and the heater connector Cn on the positive electrode side. An inverting input terminal of the operational amplifier OP1 is connected to the heater connector Cn on the negative electrode side and a drain terminal of the switch S6, the heater connector Cn being connected to the other end of the heater HTR, the drain terminal of the switch S6 being constituted by an N-channel MOSFET. A source terminal of the switch S6 is connected to the ground line. A gate terminal of the switch S6 is connected to a terminal P14 of the MCU 1, an anode of the diode D4, and the enable terminal EN of the step-up DC/DC converter 9. A cathode of the diode D4 is connected to a Q terminal of the FF 17. One end of a resistor R4 is connected to an output terminal of the operational amplifier OP1. The other end of the resistor R4 is connected to a terminal P9 of the MCU 1 and a drain terminal of the switch S5 constituted by an N-channel MOSFET. A source terminal of the switch S5 is connected to the ground line. A gate terminal of the switch S5 is connected to the connection line between the resistor Rs and the heater connector Cn on the positive electrode side.

The input terminal VBUS of the charging IC 2 is connected to an anode of each of the LEDs L1 to L8. Cathodes of the LEDs L1 to L8 are connected to control terminals PD1 to PD8 of the MCU 1 via resistors for current limitation, respectively. That is, the LEDs L1 to L8 are connected in parallel with the input terminal VBUS. The LEDs L1 to L8 are configured to be able to be operated by the USB voltage $V_{USB}$ supplied from the USB cable connected to the receptacle RCP and a voltage supplied from the power supply BAT via the charging IC 2. Transistors (switching elements) connected to the control terminal PD1 to the control terminal PD8 and the ground terminal GND are built in the MCU 1. The MCU 1 turns on the transistor connected to the control terminal PD1 to energize the LED L1 and turn on the LED L1. The MCU 1 turns off the transistor connected to the control terminal PD1 to turn off the LED L1. By switching ON and OFF of the transistor connected to the control terminal PD1 at a high speed, the luminance and the light emission pattern of the LED L1 can be dynamically controlled. Similarly, the LEDs L2 to L8 are controlled to be turned on and turned off by the MCU 1.

The charging IC 2 has a charging function of charging the power supply BAT based on the USB voltage $V_{USB}$ input to the input terminal VBUS. The charging IC 2 acquires a charging current or a charging voltage of the power supply BAT from a terminal or wiring (not illustrated), and performs charging control of the power supply BAT (control on supply of power from the charging terminal bat to the power supply BAT) based on the acquired charging current or charging voltage. In addition, the charging IC 2 may acquire, from the MCU 1, the temperature information of the power supply BAT transmitted from the remaining amount meter IC 12 to the MCU 1 through serial communication using the communication line LN and use the temperature information for charging control.

The charging IC 2 further includes a $V_{BAT}$ power path function and an OTG function. The $V_{BAT}$ power path function is a function of outputting, from an output terminal SYS, a system power supply voltage Vcc0 which is substantially equal to the power supply voltage $V_{BAT}$ input to the charging terminal bat. The OTG function is a function of outputting a system power supply voltage Vcc4 obtained by stepping up the power supply voltage $V_{BAT}$ input to the charging terminal bat from the input terminal VBUS. ON/OFF of the OTG function of the charging IC 2 is controlled by the MCU 1 through serial communication using the communication line LN. In the OTG function, the power supply voltage $V_{BAT}$ input to the charging terminal bat may be output as it is from the input terminal VBUS. In this case, the power supply voltage $V_{BAT}$ is substantially equal to the system power supply voltage Vcc4.

The output terminal SYS of the charging IC 2 is connected to an input terminal VIN of the step-up/step-down DC/DC converter 8. One end of a reactor La is connected to the switching terminal SW of the charging IC 2. The other end of the reactor La is connected to the output terminal SYS of the charging IC 2. A charge enable terminal CE($\overline{\ \ }$) of the charging IC 2 is connected to a terminal P22 of the MCU 1 via a resistor. Further, a collector terminal of the bipolar transistor S1 is connected to the charge enable terminal CE($\overline{\ \ }$) of the charging IC 2. An emitter terminal of the bipolar transistor S1 is connected to an output terminal VOUT of the LSW 4 to be described later. A base terminal of the bipolar transistor S1 is connected to the Q terminal of the FF 17. Further, one end of a resistor Rc is connected to the charge enable terminal CE($\overline{\ \ }$) of the charging IC 2. The other end of the resistor Rc is connected to the output terminal VOUT of the LSW 4.

A resistor is connected to the input terminal VIN and an enable terminal EN of the step-up/step-down DC/DC converter 8. By inputting the system power supply voltage Vcc0 from the output terminal SYS of the charging IC 2 to the input terminal VIN of the step-up/step-down DC/DC converter 8, a signal input to the enable terminal EN of the step-up/step-down DC/DC converter 8 becomes a high level, and the step-up/step-down DC/DC converter 8 starts a step-up operation or a step-down operation. The step-up/step-down DC/DC converter 8 steps up or steps down the system power supply voltage Vcc0 input to the input terminal VIN by switching control of a built-in transistor connected to a reactor Lb to generate a system power supply voltage Vcc1, and outputs the system power supply voltage Vcc1 from the output terminal VOUT. The output terminal VOUT of the step-up/step-down DC/DC converter 8 is connected to a feedback terminal FB of the step-up/step-down DC/DC converter 8, an input terminal VIN of the LSW 4, an input terminal VIN of the switch driver 7, and the power supply terminal VCC and a D terminal of the FF 16. A wiring to which the system power supply voltage Vcc1 output from the output terminal VOUT of the step-up/step-down DC/DC converter 8 is supplied is referred to as a power supply line PL1.

When the signal input to a control terminal ON becomes a high level, the LSW 4 outputs, from the output terminal VOUT, the system power supply voltage Vcc1 input to the input terminal VIN. The control terminal ON of the LSW 4 and the power supply line PL1 are connected via a resistor. Therefore, by supplying the system power supply voltage Vcc1 to the power supply line PL1, the high-level signal is input to the control terminal ON of the LSW 4. The voltage output by the LSW 4 is the same as the system power supply voltage Vcc1 when a wiring resistance or the like is ignored, but in order to distinguish from the system power supply voltage Vcc1, the voltage output from the output terminal VOUT of the LSW 4 is hereinafter referred to as a system power supply voltage Vcc2.

The output terminal VOUT of the LSW 4 is connected to the power supply terminal VDD of the MCU 1, an input terminal VIN of the LSW 5, the power supply terminal VDD of the remaining amount meter IC 12, the power supply terminal VCC of the ROM 6, the emitter terminal of the bipolar transistor S1, the resistor Rc, and the power supply terminal VCC of the FF 17. A wiring to which the system power supply voltage Vcc2 output from the output terminal VOUT of the LSW 4 is supplied is referred to as a power supply line PL2.

When a signal input to a control terminal ON becomes a high level, the LSW 5 outputs, from an output terminal VOUT thereof, the system power supply voltage Vcc2 input to the input terminal VIN. The control terminal ON of the LSW 5 is connected to a terminal P23 of the MCU 1. A voltage output by the LSW 5 is the same as the system power supply voltage Vcc2 when a wiring resistance or the like is ignored, but in order to distinguish from the system power supply voltage Vcc2, the voltage output from the output terminal VOUT of the LSW 5 is hereinafter referred to as a system power supply voltage Vcc3. A wiring to which the system power supply voltage Vcc3 output from the output terminal VOUT of the LSW 5 is supplied is referred to as a power supply line PL3.

A series circuit of the thermistor T2 and a resistor Rt2 is connected to the power supply line PL3, and the resistor Rt2 is connected to the ground line. The thermistor T2 and the resistor Rt2 constitute a voltage divider circuit, and a connection point thereof is connected to a terminal P21 of the MCU 1. The MCU 1 detects a temperature variation (resistance value variation) of the thermistor T2 based on the voltage input to the terminal P21, and determines presence or absence of a puff operation based on a temperature variation amount.

A series circuit of the thermistor T3 and a resistor Rt3 is connected to the power supply line PL3, and the resistor Rt3 is connected to the ground line. The thermistor T3 and the resistor Rt3 constitute a voltage divider circuit, and a connection point thereof is connected to a terminal P13 of the MCU 1 and an inverting input terminal of the operational amplifier OP2. The MCU 1 detects a temperature of the thermistor T3 (corresponding to the temperature of the heater HTR) based on the voltage input to the terminal P13.

A series circuit of the thermistor T4 and a resistor Rt4 is connected to the power supply line PL3, and the resistor Rt4 is connected to the ground line. The thermistor T4 and the resistor Rt4 constitute a voltage divider circuit, and a connection point thereof is connected to a terminal P12 of the MCU 1 and an inverting input terminal of the operational amplifier OP3. The MCU 1 detects a temperature of the thermistor T4 (corresponding to the temperature of the case 110) based on the voltage input to the terminal P12.

A source terminal of a switch S7 constituted by a MOSFET is connected to the power supply line PL2. A gate terminal of the switch S7 is connected to a terminal P20 of the MCU 1. A drain terminal of the switch S7 is connected to one of a pair of connectors to which the vibration motor M is connected. The other of the pair of connectors is connected to the ground line. The MCU 1 can control opening and closing of the switch S7 by operating a potential of the terminal P20 to vibrate the vibration motor M in a specific pattern. A dedicated driver IC may be used instead of the switch S7.

A positive power supply terminal of the operational amplifier OP2 and a voltage divider circuit Pd (series circuit of two resistors) connected to a non-inverting input terminal of the operational amplifier OP2 are connected to the power supply line PL2. A connection point of the two resistors constituting the voltage divider circuit Pd is connected to the non-inverting input terminal of the operational amplifier OP2. The operational amplifier OP2 outputs a signal corresponding to the temperature of the heater HTR (signal corresponding to a resistance value of the thermistor T3). In the present embodiment, since a thermistor having the NTC characteristic is used as the thermistor T3, an output voltage of the operational amplifier OP2 decreases as the temperature of the heater HTR (temperature of the thermistor T3) increases. A reason is that a negative power supply terminal of the operational amplifier OP2 is connected to the ground line, and the value of the output voltage of the operational amplifier OP2 becomes substantially equal to the value of the ground potential when the voltage value (divided value by the thermistor T3 and the resistor Rt3) input to the inverting input terminal of the operational amplifier OP2 becomes higher than the voltage value (divided value by the voltage divider circuit Pd) input to the non-inverting input terminal of the operational amplifier OP2. That is, when the temperature of the heater HTR (temperature of the thermistor T3) becomes high, the output voltage of the operational amplifier OP2 becomes a low level.

When a thermistor having the PTC characteristic is used as the thermistor T3, outputs of voltage divider circuits of the thermistor T3 and the resistor Rt3 may be connected to the non-inverting input terminal of the operational amplifier OP2, and an output of the voltage divider circuit Pd may be connected to the inverting input terminal of the operational amplifier OP2.

A positive power supply terminal of the operational amplifier OP3 and a voltage divider circuit Pe (series circuit of two resistors) connected to a non-inverting input terminal of the operational amplifier OP3 are connected to the power supply line PL2. A connection point of the two resistors constituting the voltage divider circuit Pe is connected to the non-inverting input terminal of the operational amplifier OP3. The operational amplifier OP3 outputs a signal corresponding to the temperature of the case 110 (signal corresponding to a resistance value of the thermistor T4). In the present embodiment, since a thermistor having the NTC characteristic is used as the thermistor T4, the output voltage of the operational amplifier OP3 decreases as the temperature of the case 110 increases. A reason is that a negative power supply terminal of the operational amplifier OP3 is connected to the ground line, and the value of the output voltage of the operational amplifier OP3 becomes substantially equal to the value of the ground potential when the voltage value (divided value by the thermistor T4 and the resistor Rt4) input to the inverting input terminal of the operational amplifier OP3 becomes higher than the voltage value (divided value by the voltage divider circuit Pe) input to the non-inverting input terminal of the operational amplifier OP3. That is, when the temperature of the thermistor T4 becomes high, the output voltage of the operational amplifier OP3 becomes a low level.

When a thermistor having the PTC characteristic is used as the thermistor T4, outputs of voltage divider circuits of the thermistor T4 and the resistor Rt4 may be connected to the non-inverting input terminal of the operational amplifier OP3, and an output of the voltage divider circuit Pe may be connected to the inverting input terminal of the operational amplifier OP3.

A resistor R1 is connected to an output terminal of the operational amplifier OP2. A cathode of a diode D1 is connected to the resistor R1. An anode of the diode D1 is connected to an output terminal of the operational amplifier OP3, a D terminal of the FF 17, and a CLR(—) terminal of the FF 17. A resistor R2 connected to the power supply line PL1 is connected to a connection line between the resistor R1 and the diode D1. In addition, a CLR(—) terminal of the FF 16 is connected to the connection line.

One end of a resistor R3 is connected to a connection line between the D terminal of the FF 17 and a connection point of the anode of the diode D1 and the output terminal of the operational amplifier OP3. The other end of the resistor R3 is connected to the power supply line PL2. Further, an anode of the diode D2 connected to the notification terminal 12*a* of the remaining amount meter IC 12, an anode of a diode D3, and the CLR(—) terminal of the FF 17 are connected to the connection line. A cathode of the diode D3 is connected to a terminal P5 of the MCU 1.

When the temperature of the heater HTR becomes excessively high, the signal output from the operational amplifier OP2 becomes small, and the signal input to the CLR(—) terminal becomes a low level, the FF 16 inputs a high-level signal from a Q(—) terminal to a terminal P11 of the MCU 1. A high-level system power supply voltage Vcc1 is supplied from the power supply line PL1 to the D terminal of the FF 16. Therefore, in the FF 16, a low-level signal is continuously output from the Q(—) terminal unless the signal input to the CLR(—) terminal operating with a negative logic becomes a low level.

The signal input to the CLR(—) terminal of the FF 17 becomes a low level when the temperature of the heater HTR becomes excessively high, when the temperature of the case 110 becomes excessively high, or when a low-level signal indicating abnormality detection is output from the notification terminal 12*a* of the remaining amount meter IC 12. The FF 17 outputs a low-level signal from the Q terminal when the signal input to the CLR(—) terminal becomes a low level. The low-level signal is input to a terminal P10 of the MCU 1, the gate terminal of the switch S6, the enable terminal EN of the step-up DC/DC converter 9, and the base terminal of the bipolar transistor S1 connected to the charging IC 2. When a low-level signal is input to the gate terminal of the switch S6, a gate-source voltage of the N-channel MOSFET constituting the switch S6 becomes lower than a threshold voltage, and thus the switch S6 is turned off. When a low-level signal is input to the enable terminal EN of the step-up DC/DC converter 9, the enable terminal EN of the step-up DC/DC converter 9 is a positive logic, and thus the step-up operation is stopped. When a low-level signal is input to the base terminal of the bipolar transistor S1, the bipolar transistor S1 is turned on (an amplified current is output from the collector terminal). When the bipolar transistor S1 is turned on, a high-level system power supply voltage Vcc2 is input to a CE(—) terminal of the charging IC 2 via the bipolar transistor S1. Since the CE(—) terminal of the charging IC 2 is a negative logic, the charging of the power supply BAT is stopped. Accordingly, the heating of the heater HTR and the charging of the power supply BAT are stopped. Even when the MCU 1 outputs a low-level enable signal from the terminal P22 to the charge enable terminal CE(—) of the charging IC 2, an amplified current is input from the collector terminal to the terminal P22 of the MCU 1 and the charge enable terminal CE(—) of the charging IC 2 when the bipolar transistor S1 is turned on. Accordingly, it should be noted that a high-level signal is input to the charge enable terminal CE(—) of the charging IC 2.

A high-level system power supply voltage Vcc2 is supplied from the power supply line PL2 to the D terminal of the FF 17. Therefore, in the FF 17, a high-level signal continues to be output from the Q terminal unless a signal input to the CLR(—) terminal operating in a negative logic becomes a low level. When a low-level signal is output from the output terminal of the operational amplifier OP3, the low-level signal is input to the CLR(—) terminal of the FF 17 regardless of the level of the signal output from the output terminal of the operational amplifier OP2. It should be noted that when a high-level signal is output from the output terminal of the operational amplifier OP2, the low-level signal output from the output terminal of the operational amplifier OP3 is not affected by the high-level signal by the diode D1. In addition, when a low-level signal is output from the output terminal of the operational amplifier OP2, even when a high-level signal is output from the output terminal of the operational amplifier OP3, the high-level signal is replaced with a low-level signal via the diode D1.

The power supply line PL2 further branches from the MCU-mounted board 161 toward the LED-mounted board 163 and the Hall IC-mounted board 164. The power supply terminal VDD of the Hall IC 13, the power supply terminal VCC of the communication IC 15, and the power supply terminal VDD of the Hall IC 14 are connected to the branched power supply line PL2.

An output terminal OUT of the Hall IC 13 is connected to a terminal P3 of the MCU 1 and a terminal SW2 of the switch driver 7. When the outer panel 115 is detached, a low-level signal is output from the output terminal OUT of the Hall IC 13. The MCU 1 determines whether the outer panel 115 is attached based on the signal input to the terminal P3.

The LED-mounted board 163 is provided with the series circuit (series circuit of a resistor and a capacitor) connected to the operation switch OPS. The series circuit is connected to the power supply line PL2. A connection point between the resistor and the capacitor of the series circuit is connected to the terminal P4 of the MCU 1, the operation switch OPS, and a terminal SW1 of the switch driver 7. In a state where the operation switch OPS is not pressed, the operation switch OPS is not conducted, and the signals input to the terminal P4 of the MCU 1 and the terminal SW1 of the switch driver 7 become a high level by the system power supply voltage Vcc2. When the operation switch OPS is pressed and the operation switch OPS is brought into a conductive state, the signals input to the terminal P4 of the MCU 1 and the terminal SW1 of the switch driver 7 become a low level because of connection to the ground line. The MCU 1 detects the operation of the operation switch OPS based on the signal input to the terminal P4.

The switch driver 7 is provided with a reset input terminal RSTB. The reset input terminal RSTB is connected to the control terminal ON of the LSW 4. When both the levels of the signals input to the terminal SW1 and the terminal SW2 become a low level (a state where the outer panel 115 is detached and the operation switch OPS is pressed), the switch driver 7 outputs a low-level signal from the reset input terminal RSTB, thereby stopping the output operation of the LSW 4. That is, when the operation switch OPS, which is originally pressed down via the pressing portion 117 of the outer panel 115, is directly pressed down by the user in a state where the outer panel 115 is detached, both the levels of the signals input to the terminal SW1 and the terminal SW2 of the switch driver 7 become a low level.

<Operation in Each Operation Mode of Inhaler>

Figure 13:
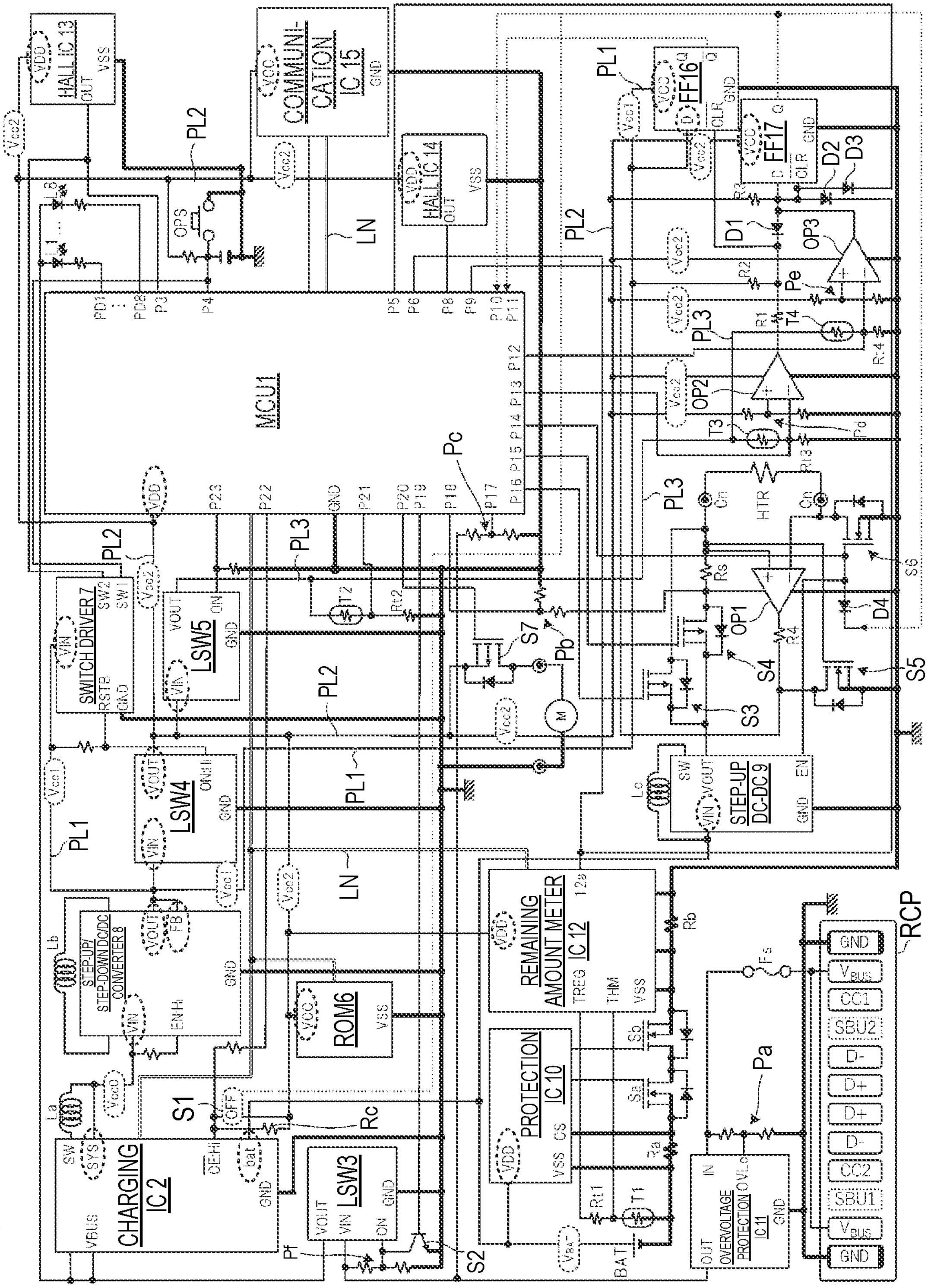
FIG. 13 is a diagram for illustrating an operation of the electric circuit in a sleep mode.
Figure 14:
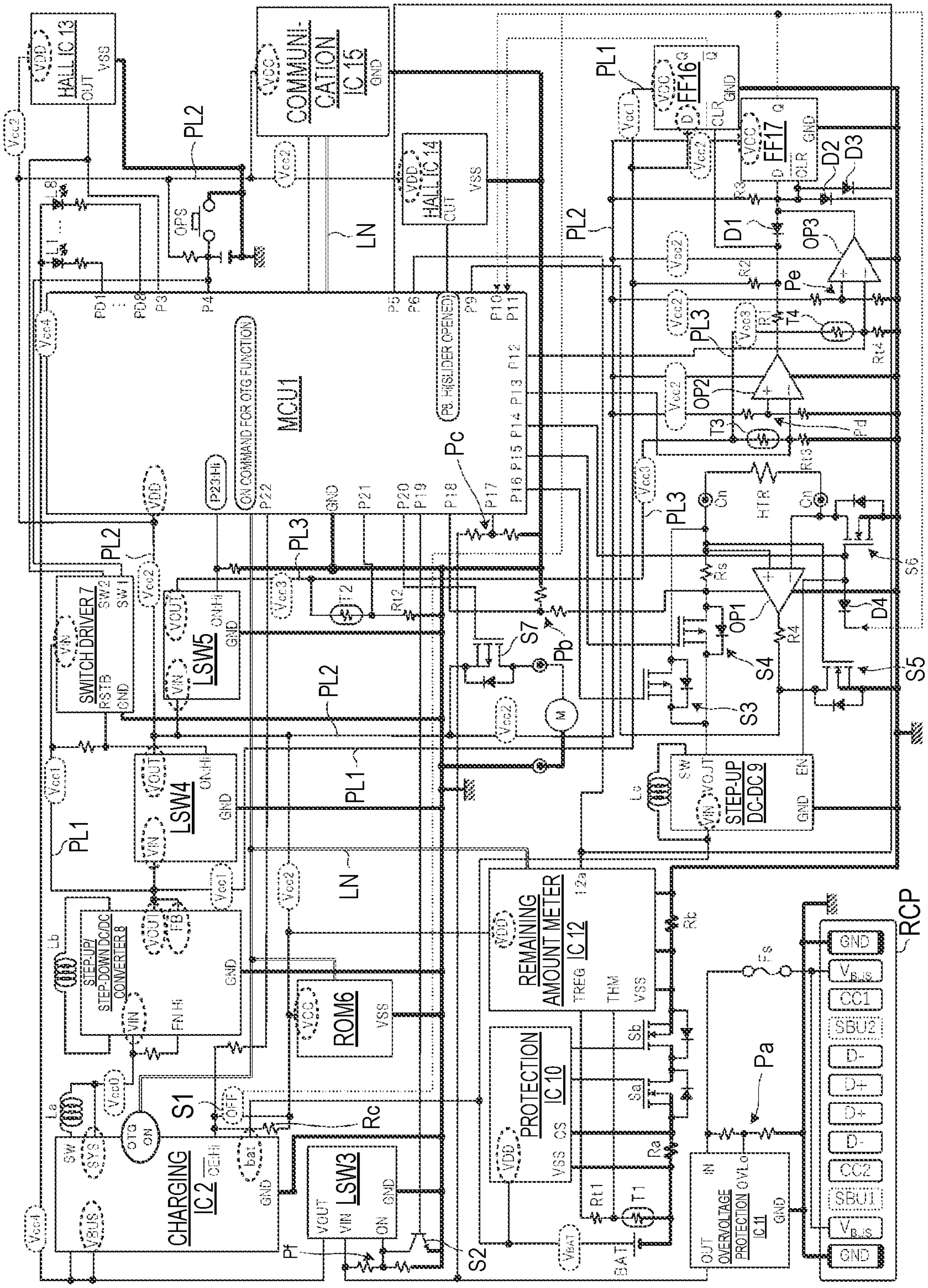
FIG. 14 is a diagram for illustrating an operation of the electric circuit in an active mode.
Figure 15:
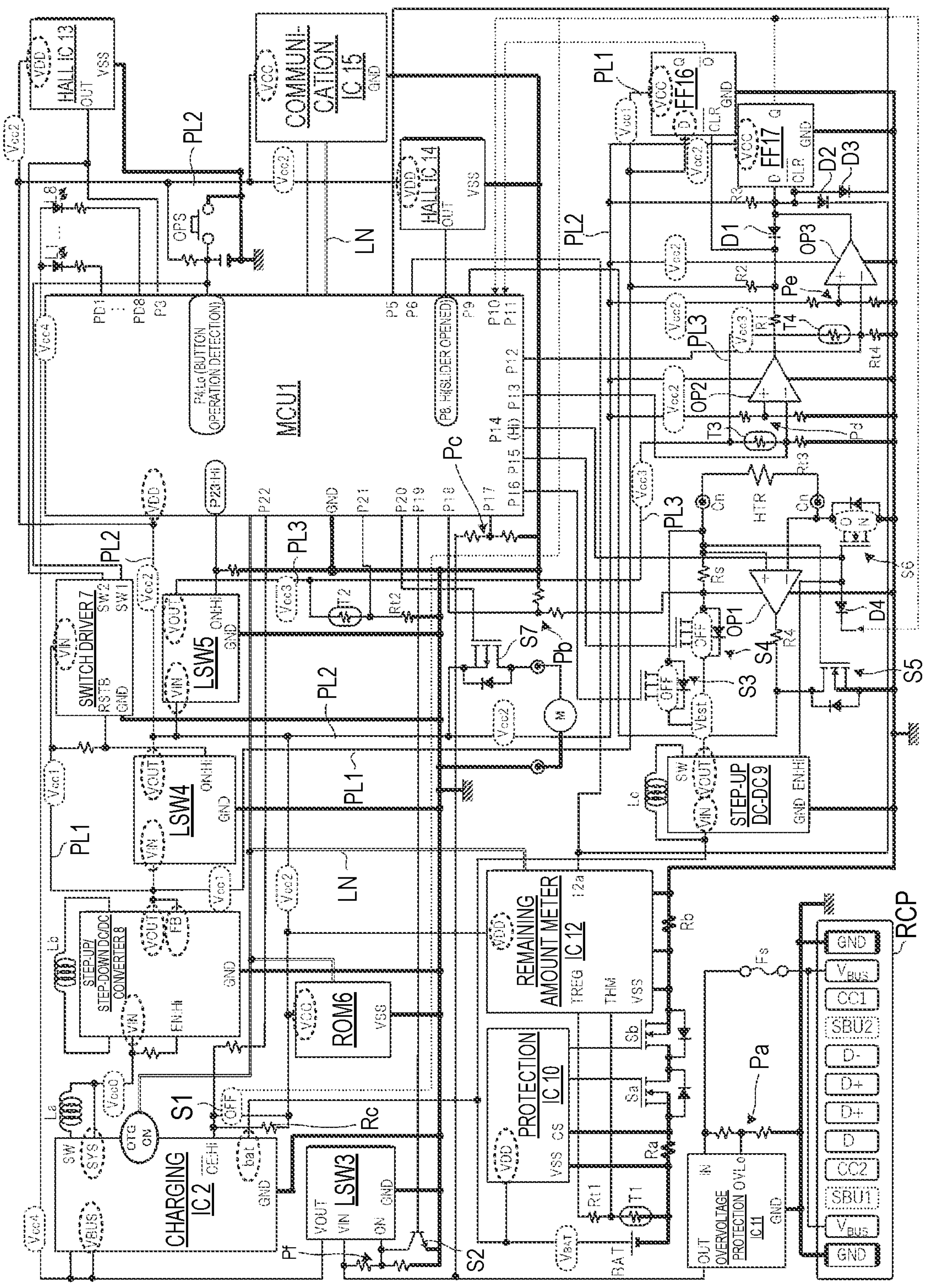
FIG. 15 is a diagram for illustrating an operation of the electric circuit in a heating initial setting mode.
Figure 16:
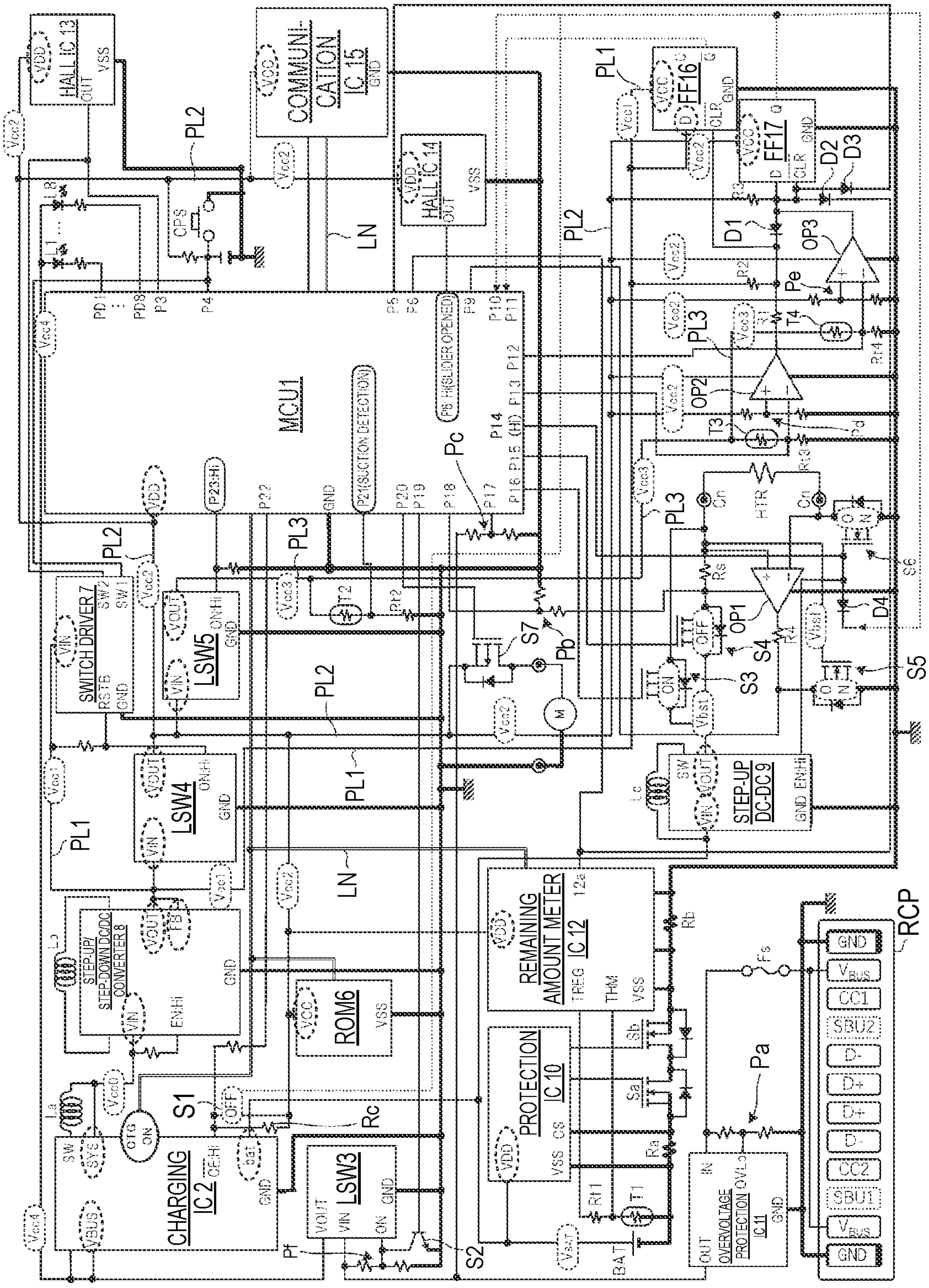
FIG. 16 is a diagram for illustrating an operation of the electric circuit at the time of heating the heater in a heating mode.
Figure 17:
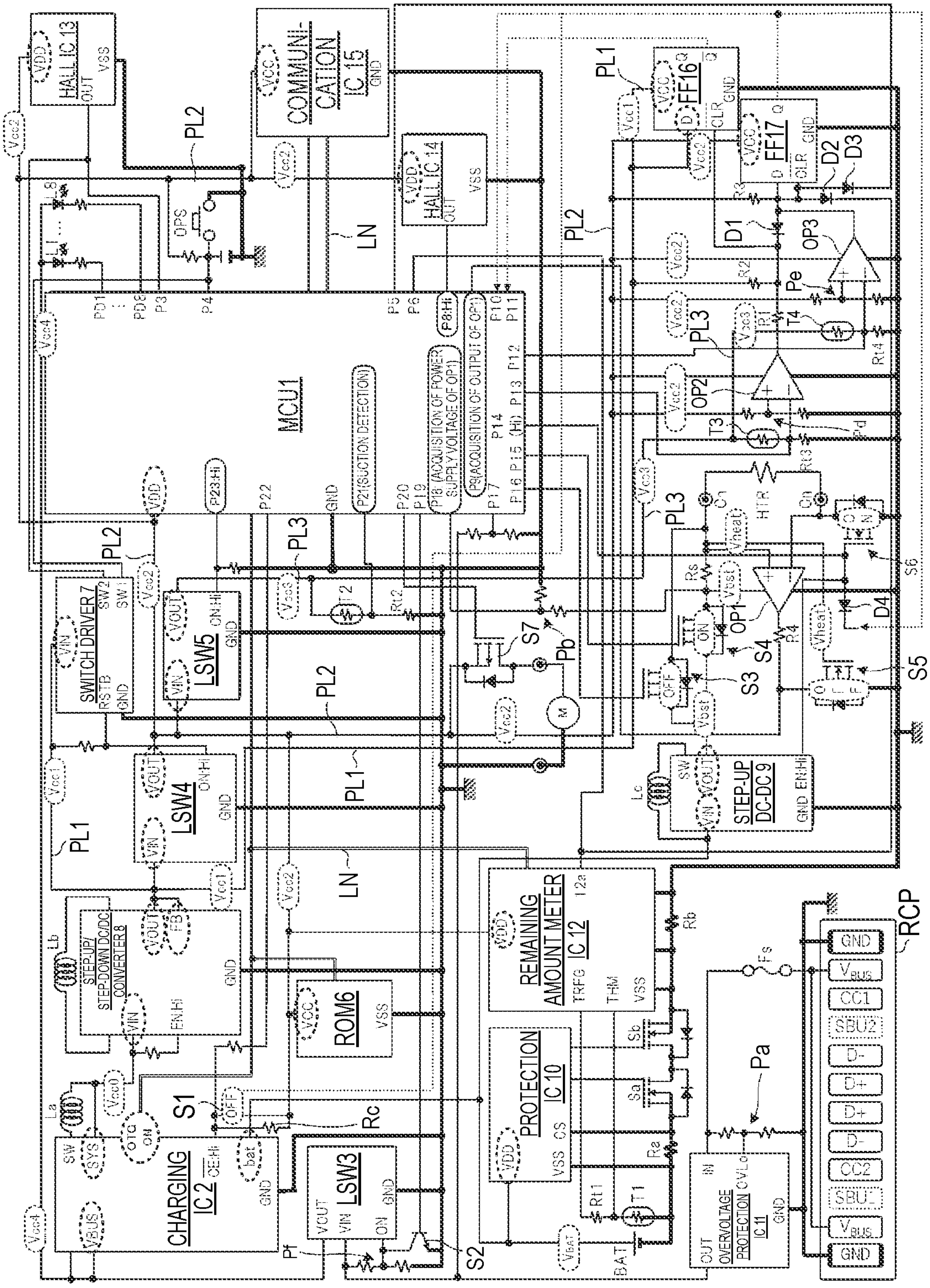
FIG. 17 is a diagram for illustrating an operation of the electric circuit at the time of detecting a temperature of the heater in the heating mode.
Figure 18:
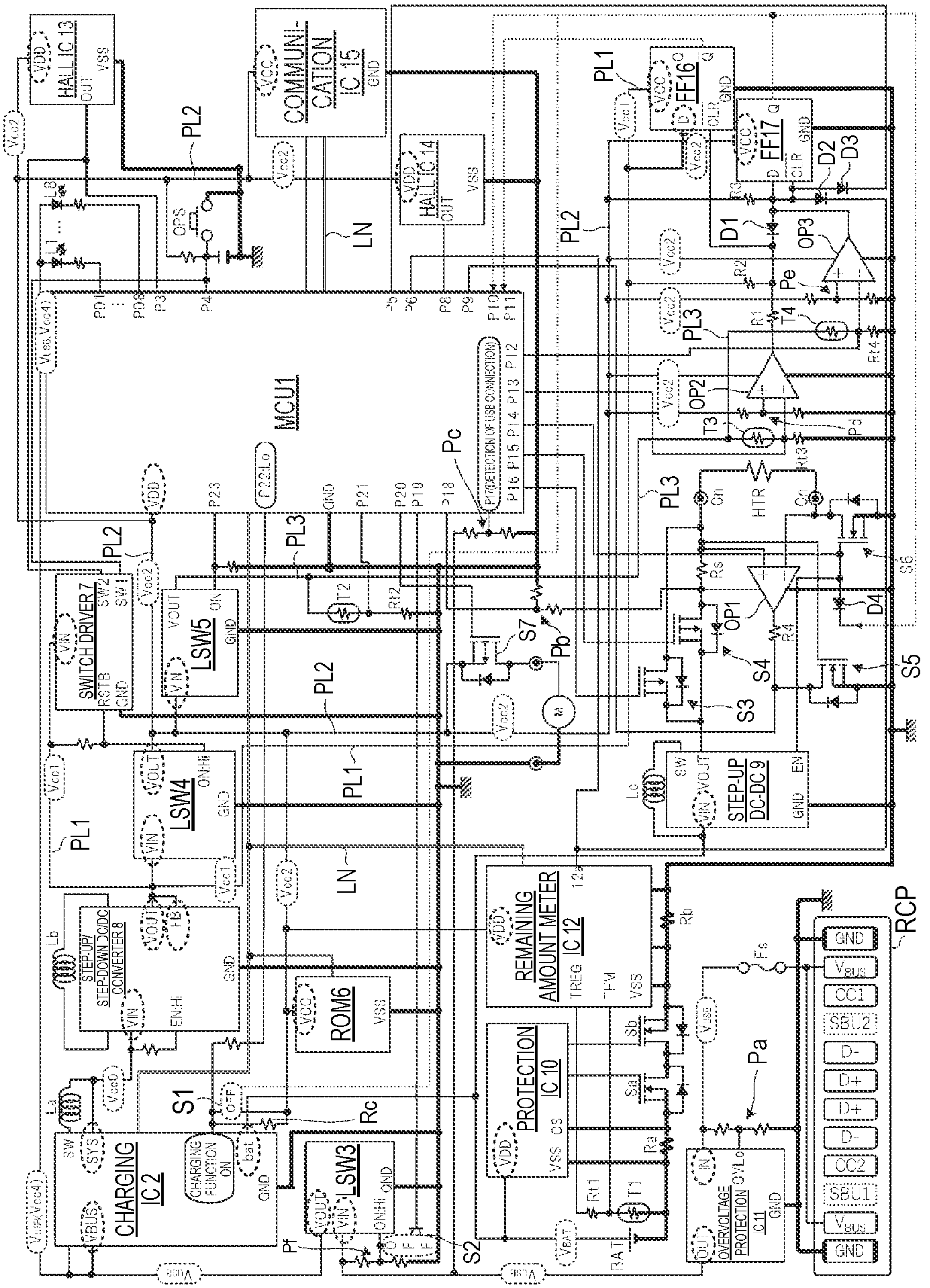
FIG. 18 is a diagram for illustrating an operation of the electric circuit in a charging mode.
Figure 19:
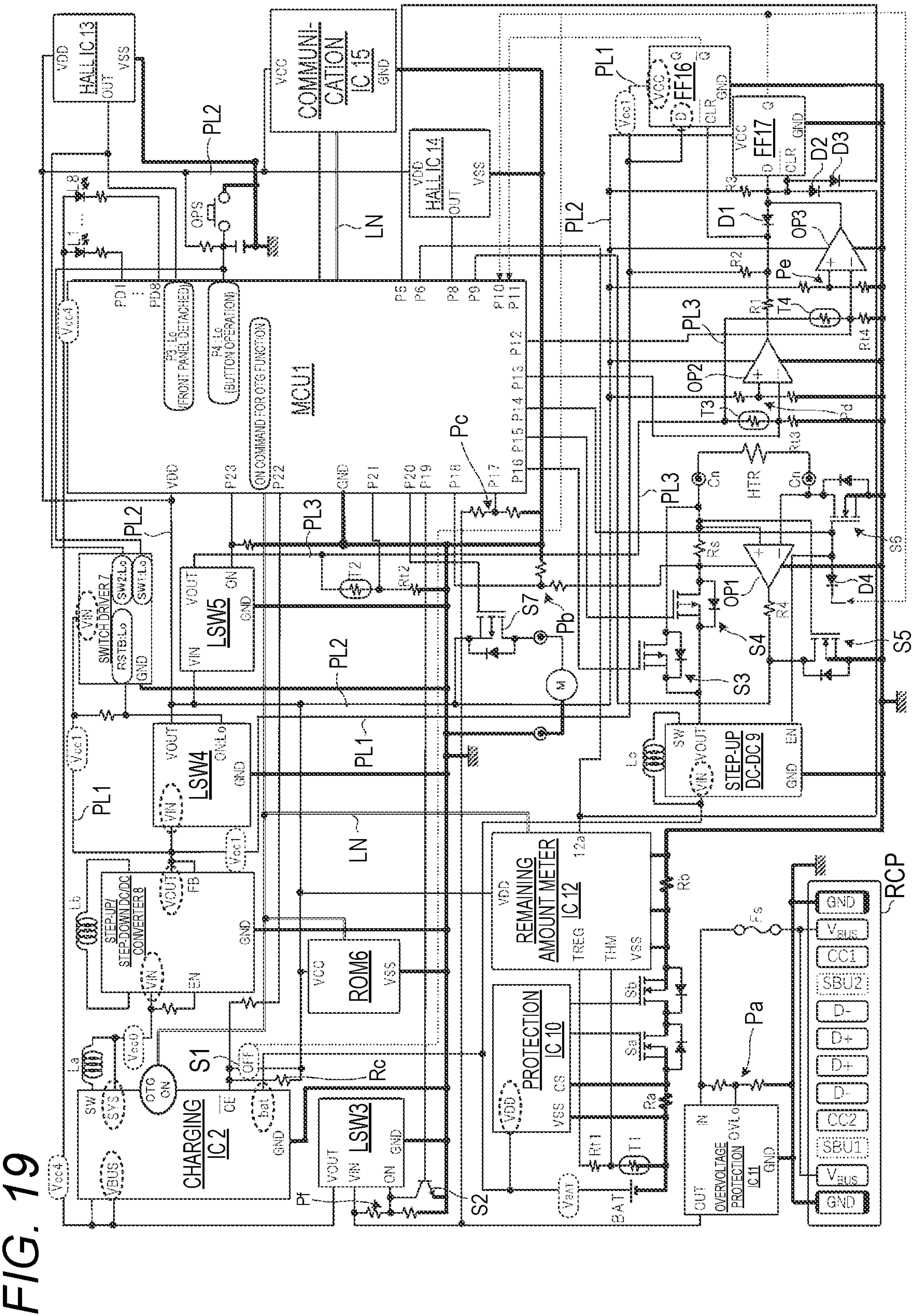
FIG. 19 is a diagram for illustrating an operation of the electric circuit at the time of resetting (restarting) an MCU.

Hereinafter, operations of the electric circuit illustrated in FIG. 10 will be described with reference to FIGS. 13 to 19. FIG. 13 is a diagram for illustrating an operation of the electric circuit in the sleep mode. FIG. 14 is a diagram for illustrating an operation of the electric circuit in the active mode. FIG. 15 is a diagram for illustrating an operation of the electric circuit in the heating initial setting mode. FIG. 16 is a diagram for illustrating an operation of the electric circuit at the time of heating the heater HTR in the heating mode. FIG. 17 is a diagram for illustrating an operation of the electric circuit at the time of detecting the temperature of the heater HTR in the heating mode. FIG. 18 is a diagram for illustrating an operation of the electric circuit in the charging mode. FIG. 19 is a diagram for illustrating an operation of the electric circuit at the time of resetting (restarting) the MCU 1. In each of FIGS. 13 to 19, terminals surrounded by a broken ellipse, among the terminals of the electronic components formed into chips, indicate terminals to which the power supply voltage $V_{BAT}$, the USB voltage $V_{USB}$, the system power supply voltage, and the like are input or output.

In any operation mode, the power supply voltage $V_{BAT}$ is input to the power supply terminal VDD of the protection IC 10, the input terminal VIN of the step-up DC/DC converter 9, and the charging terminal bat of the charging IC 2.

<Sleep Mode: FIG. 13>

The MCU 1 enables the $V_{BAT}$ power path function of the charging IC 2 and disables the OTG function and the charging function. The USB voltage $V_{USB}$ is not input to the input terminal VBUS of the charging IC 2, whereby the $V_{BAT}$ power path function of the charging IC 2 is enabled. Since a signal for enabling the OTG function from the communication line LN is not output from the MCU 1 to the charging IC 2, the OTG function is disabled. Therefore, the charging IC 2 generates the system power supply voltage Vcc0 from the power supply voltage $V_{BAT}$ input to the charging terminal bat, and outputs the system power supply voltage Vcc0 from the output terminal SYS. The system power supply voltage Vcc0 output from the output terminal SYS is input to the input terminal VIN and the enable terminal EN of the step-up/step-down DC/DC converter 8. The step-up/step-down DC/DC converter 8 is enabled by inputting the high-level system power supply voltage Vcc0 to the enable terminal EN which is a positive logic, generates the system power supply voltage Vcc1 from the system power supply voltage Vcc0, and outputs the system power supply voltage Vcc1 from the output terminal VOUT. The system power supply voltage Vcc1 output from the output terminal VOUT of the step-up/step-down DC/DC converter 8 is supplied to the input terminal VIN of the LSW 4, the control terminal ON of the LSW 4, the input terminal VIN of the switch driver 7, and the power supply terminal VCC and the D terminal of the FF 16.

By inputting the system power supply voltage Vcc1 to the control terminal ON, the LSW 4 outputs, from the output terminal VOUT, the system power supply voltage Vcc1 input to the input terminal VIN as the system power supply voltage Vcc2. The system power supply voltage Vcc2 output from the LSW 4 is input to the power supply terminal VDD of the MCU 1, the input terminal VIN of the LSW 5, the power supply terminal VDD of the Hall IC 13, the power supply terminal VCC of the communication IC 15, and the power supply terminal VDD of the Hall IC 14. Further, the system power supply voltage Vcc2 is supplied to the power supply terminal VDD of the remaining amount meter IC 12, the power supply terminal VCC of the ROM 6, the resistor Rc and the bipolar transistor S1 connected to the charge enable terminal CE(‾) of the charging IC 2, the power supply terminal VCC of the FF 17, the positive power supply terminal of the operational amplifier OP3, the voltage divider circuit Pe, the positive power supply terminal of the operational amplifier OP2, and the voltage divider circuit Pd. The bipolar transistor S1 connected to the charging IC 2 is turned off unless a low-level signal is output from the Q terminal of the FF 17. Therefore, the system power supply voltage Vcc2 generated by the LSW 4 is also input to the charge enable terminal CE(‾) of the charging IC 2. Since the charge enable terminal CE(‾) of the charging IC 2 is a negative logic, the charging function by the charging IC 2 is turned off in this state.

In this manner, since the LSW 5 stops outputting the system power supply voltage Vcc3 in the sleep mode, the supply of power to the electronic components connected to the power supply line PL3 is stopped. In addition, since the OTG function of the charging IC 2 is stopped in the sleep mode, the supply of power to the LEDs L1 to L8 is stopped.

<Active Mode: FIG. 14>

When the MCU 1 detects that the signal input to the terminal P8 becomes a high level and the slider 119 is opened from the sleep mode state in FIG. 13, the MCU 1 inputs a high-level signal to the control terminal ON of the LSW 5 from the terminal P23. Accordingly, the LSW 5 outputs, from the output terminal VOUT, the system power supply voltage Vcc2 input to the input terminal VIN as the system power supply voltage Vcc3. The system power supply voltage Vcc3 output from the output terminal VOUT of the LSW 5 is supplied to the thermistor T2, the thermistor T3, and the thermistor T4.

Further, when the MCU 1 detects that the slider 119 is opened, the MCU 1 enables the OTG function of the charging IC 2 via the communication line LN. Accordingly, the charging IC 2 outputs, from the input terminal VBUS, the system power supply voltage Vcc4 obtained by stepping up the power supply voltage VSAT input from the charging terminal bat. The system power supply voltage Vcc4 output from the input terminal VBUS is supplied to the LEDs L1 to L8.

<Heating Initial Setting Mode: FIG. 15>

When the signal input to the terminal P4 becomes a low level (the operation switch OPS is pressed) from the state in FIG. 14, the MCU 1 performs various settings necessary for heating, and then inputs a high-level enable signal from the terminal P14 to the enable terminal EN of the step-up DC/DC converter 9. Accordingly, the step-up DC/DC converter 9 outputs, from the output terminal VOUT, the drive voltage $V_{bst}$ obtained by stepping up the power supply voltage $V_{BAT}$. The drive voltage $V_{bst}$ is supplied to the switch S3 and the switch S4. In this state, the switch S3 and the switch S4 are turned off. In addition, the switch S6 is turned on by a high-level enable signal output from the terminal P14. Accordingly, a negative electrode-side terminal of the heater HTR is connected to the ground line, and the heater HTR is brought into a state of being heated by turning on the switch S3. After the enable signal of the high-level signal is output from the terminal P14 of the MCU 1, the operation mode shifts to the heating mode.

<Heater Heating in Heating Mode: FIG. 16>

In the state of FIG. 15, the MCU 1 starts switching control of the switch S3 connected to the terminal P16 and switching control of the switch S4 connected to the terminal P15. The switching control may be automatically started when the heating initial setting mode described above is completed, or may be started by further pressing the operation switch OPS. Specifically, the MCU 1 performs, as illustrated in FIG. 16, heating control in which the switch S3 is turned on, the switch S4 is turned off, the drive voltage $V_{bst}$ is supplied to the heater HTR, and the heater HTR is heated for generating aerosol, and performs, as illustrated in FIG. 17, temperature detection control in which the switch S3 is turned off, the switch S4 is turned on, and the temperature of the heater HTR is detected.

As illustrated in FIG. 16, during the heating control, the drive voltage $V_{bst}$ is also supplied to a gate of the switch S5, and the switch S5 is turned on. In addition, during the heating control, the drive voltage $V_{bst}$ passing through the switch S3 is also input to the positive power supply terminal of the operational amplifier OP1 via the resistor Rs. A resistance value of the resistor Rs is small enough to be negligible as compared with an internal resistance value of the operational amplifier OP1. Therefore, during the heating control, the voltage input to the positive power supply terminal of the operational amplifier OP1 is substantially equal to the drive voltage $V_{bst}$.

A resistance value of the resistor R4 is larger than an on-resistance value of the switch S5. The operational amplifier OP1 also operates during the heating control, but the switch S5 is turned on during the heating control. In a state where the switch S5 is turned on, the output voltage of the operational amplifier OP1 is divided by a voltage divider circuit of the resistor R4 and the switch S5 and is input to the terminal P9 of the MCU 1. The resistance value of the resistor R4 is larger than the on-resistance value of the switch S5, whereby the voltage input to the terminal P9 of the MCU 1 becomes sufficiently small. Accordingly, it is possible to prevent a large voltage from being input from the operational amplifier OP1 to the MCU 1.

<Heater Temperature Detection in Heating Mode: FIG. 17>

As illustrated in FIG. 17, during the temperature detection control, the drive voltage $V_{bst}$ is input to the positive power supply terminal of the operational amplifier OP1 and is input to the voltage divider circuit Pb. The voltage divided by the voltage divider circuit Pb is input to the terminal P18 of the MCU 1. The MCU 1 acquires a reference voltage $V_{temp}$ applied to a series circuit of the resistor Rs and the heater HTR during the temperature detection control based on the voltage input to the terminal P18.

In addition, during the temperature detection control, the drive voltage $V_{bst}$ (reference voltage $V_{temp}$) is supplied to the series circuit of the resistor Rs and the heater HTR. Further, a voltage $V_{heat}$ obtained by dividing the drive voltage $V_{bst}$ (reference voltage $V_{temp}$) by the resistor Rs and the heater HTR is input to the non-inverting input terminal of the operational amplifier OP1. Since the resistance value of the resistor Rs is sufficiently larger than a resistance value of the heater HTR, the voltage $V_{heat}$ is a value sufficiently lower than the drive voltage $V_{bst}$. During the temperature detection control, the low voltage $V_{heat}$ is also supplied to the gate terminal of the switch S5, whereby the switch S5 is turned off. The operational amplifier OP1 amplifies a difference between the voltage input to the inverting input terminal and the voltage $V_{heat}$ input to the non-inverting input terminal and outputs the amplified difference.

An output signal of the operational amplifier OP1 is input to the terminal P9 of the MCU 1. The MCU 1 acquires the temperature of the heater HTR based on the signal input to the terminal P9, the reference voltage $V_{temp}$ acquired based on the input voltage of the terminal P18, and a known electric resistance value of the resistor Rs. The MCU 1 performs the heating control of the heater HTR (for example, control such that the temperature of the heater HTR becomes a target temperature) based on the acquired temperature of the heater HTR.

The MCU 1 can also acquire the temperature of the heater HTR even in a period in which the switch S3 and the switch S4 are turned off (a period in which the heater HTR is not energized). Specifically, the MCU 1 acquires the temperature of the heater HTR based on the voltage input to the terminal P13 (output voltage of the voltage divider circuit including the thermistor T3 and the resistor Rt3).

In addition, the MCU 1 may also acquire the temperature of the case 110 at any timing. Specifically, the MCU 1 acquires the temperature of the case 110 based on the voltage input to the terminal P12 (output voltage of the voltage divider circuit including the thermistor T4 and the resistor Rt4).

<Charging Mode: FIG. 18>

FIG. 18 illustrates a case where the USB connection is established in the sleep mode. When the USB connection is established, the USB voltage $V_{USB}$ is input to the input terminal VIN of the LSW 3 via the overvoltage protection IC 11. The USB voltage $V_{USB}$ is also supplied to the voltage divider circuit Pf connected to the input terminal VIN of the LSW 3. Since the bipolar transistor S2 is turned on immediately after the USB connection is established, the signal input to the control terminal ON of the LSW 3 remains at a low level. The USB voltage $V_{USB}$ is also supplied to the voltage divider circuit Pc connected to the terminal P17 of the MCU 1, and a voltage divided by the voltage divider circuit Pc is input to the terminal P17. The MCU 1 detects that the USB connection is established based on the voltage input to the terminal P17.

When the MCU 1 detects that the USB connection is established, the MCU 1 turns off the bipolar transistor S2 connected to the terminal P19. When a low-level signal is input to a gate terminal of the bipolar transistor S2, the USB voltage $V_{USB}$ divided by the voltage divider circuit Pf is input to the control terminal ON of the LSW 3. Accordingly, a high-level signal is input to the control terminal ON of the LSW 3, and the LSW 3 outputs the USB voltage $V_{USB}$ from the output terminal VOUT. The USB voltage $V_{USB}$ output from the LSW 3 is input to the input terminal VBUS of the charging IC 2. In addition, the USB voltage $V_{USB}$ output from the LSW 3 is supplied to the LEDs L1 to L8 as the system power supply voltage Vcc4.

When the MCU 1 detects that the USB connection is established, the MCU 1 further outputs a low-level enable signal from the terminal P22 to the charge enable terminal CE($\overline{\ }$) of the charging IC 2. Accordingly, the charging IC 2 enables the charging function of the power supply BAT and starts charging the power supply BAT by the USB voltage $V_{USB}$ input to the input terminal VBUS.

When the USB connection is established in the active mode, when the MCU 1 detects that the USB connection is established, the MCU 1 turns off the bipolar transistor S2 connected to the terminal P19, outputs a low-level enable signal from the terminal P22 to the charge enable terminal CE(—) of the charging IC 2, and turns off the OTG function of the charging IC 2 by serial communication using the communication line LN. Accordingly, the system power supply voltage Vcc4 supplied to the LEDs L1 to L8 is switched from the voltage generated by the OTG function of the charging IC 2 (voltage based on the power supply voltage $V_{BAT}$) to the USB voltage $V_{USB}$ output from the LSW 3. The LEDs L1 to L8 is not operated unless ON control of the built-in transistor is not performed by the MCU 1. Therefore, the unstable voltage in a transition period from ON to OFF of the OTG function is prevented from being supplied to the LEDs L1 to L8.

<Resetting of MCU: FIG. 19>

When the outer panel 115 is detached, the output of the Hall IC 13 becomes a low level, an ON operation of the operation switch OPS is performed, and the signal input to the terminal P4 of the MCU 1 becomes a low level, the terminal SW1 and the terminal SW2 of the switch driver 7 both become a low level. Accordingly, the switch driver 7 outputs a low-level signal from the reset input terminal RSTB. The low-level signal output from the reset input terminal RSTB is input to the control terminal ON of the LSW 4. Accordingly, the LSW 4 stops the output of the system power supply voltage Vcc2 from the output terminal VOUT. By stopping the output of the system power supply voltage Vcc2, the system power supply voltage Vcc2 is not input to the power supply terminal VDD of the MCU 1, and thus the MCU 1 is stopped.

The switch driver 7 returns the signal output from the reset input terminal RSTB to a high level when a time during which the low-level signal is output from the reset input terminal RSTB reaches a predetermined time or when the signal input to either the terminal SW1 or the terminal SW2 becomes a high level. Accordingly, the control terminal ON of the LSW 4 becomes a high level, and the system power supply voltage Vcc2 returns to a state of being supplied to each unit.

<Details of Function of Charging IC>

Figure 20:
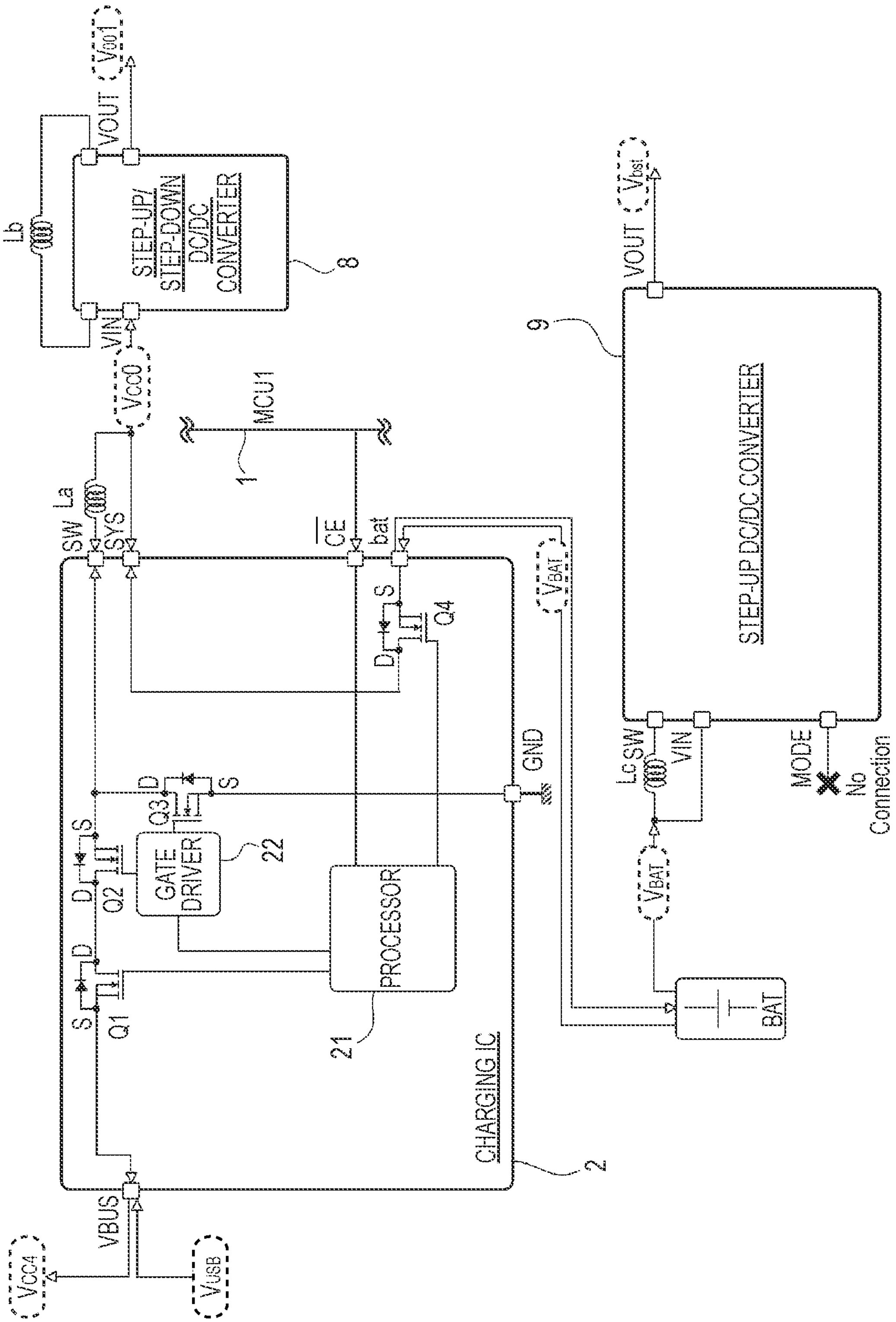
FIG. 20 is a diagram illustrating a schematic internal configuration of a charging IC.

FIG. 20 is a diagram illustrating a schematic internal configuration of the charging IC 2. The charging IC 2 includes a processor 21, a gate driver 22, and switches Q1 to Q4 each constituted by an N-channel MOSFET.

A source terminal of the switch Q1 is connected to the input terminal VBUS. A drain terminal of the switch Q1 is connected to a drain terminal of the switch Q2. A source terminal of the switch Q2 is connected to the switching terminal SW. A drain terminal of the switch Q3 is connected to a connection node between the switch Q2 and the switching terminal SW. A source terminal of the switch Q3 is connected to the ground terminal GND. A drain terminal of the switch Q4 is connected to the output terminal SYS. A source terminal of the switch Q4 is connected to the charging terminal bat.

The gate driver 22 is connected to a gate terminal of the switch Q2 and a gate terminal of the switch Q3, and performs ON/OFF control of the switches Q2 and Q3 based on a command from the processor 21.

The processor 21 is connected to the gate driver 22, a gate terminal of the switch Q1, a gate terminal of the switch Q4, and the charge enable terminal CE(—) The processor 21 performs ON/OFF control of the switches Q2 and Q3 and ON/OFF control of the switches Q1 and Q4 via the gate driver 22.

The charging IC 2 includes a $V_{USB}$ power path function and a $V_{USB}$ & $V_{BAT}$ power path function in addition to the above-described charging function, $V_{BAT}$ power path function, and OTG function. Hereinafter, contents of control inside the charging IC 2 when these functions are enabled will be described. Specific numerical values of the above various voltages are preferably values shown below.

Power supply voltage $V_{BAT}$ (full charge voltage)=4.2 V
Power supply voltage $V_{BAT}$ (nominal voltage)=3.7 V
System power supply voltage Vcc1=3.3 V
System power supply voltage Vcc2=3.3 V
System power supply voltage Vcc3=3.3 V
System power supply voltage Vcc4=5.0 V
USB voltage $V_{USB}$=5.0 V
Drive voltage $V_{bst}$=4.9 V (Charging Function)

The processor 21 performs the ON/OFF control of the switch Q2 and the switch Q4 while controlling the switch Q1 to be turned on and the switch Q3 to be turned off. The ON/OFF control of the switch Q4 is performed to adjust a charging current of the power supply BAT. The processor 21 performs ON/OFF control of the switch Q2 such that a voltage of the output terminal SYS becomes equal to a voltage suitable for charging the power supply BAT. Accordingly, the USB voltage $V_{USB}$ input to the input terminal VBUS is stepped down and output from the output terminal SYS. The voltage output from the output terminal SYS is input to the input terminal VIN of the step-up/step-down DC/DC converter 8 as the system power supply voltage Vcc0, and is output from the charging terminal bat of the charging IC 2. Accordingly, the power supply BAT is charged by using a voltage obtained by stepping down the USB voltage $V_{USB}$. When the charging function is enabled, the system power supply voltage Vcc0 finally becomes the same value as the full charge voltage of the power supply BAT. Therefore, the step-up/step-down DC/DC converter 8 steps down the system power supply voltage Vcc0 of 4.2 V input to the input terminal VIN to generate and output the system power supply voltage Vcc1 of 3.3 V. When the charging function is enabled, in the charging IC 2, a potential of the input terminal VBUS is higher than a potential of the output terminal SYS, and thus a power from the power supply BAT is not output from the input terminal VBUS.

($V_{USB}$ Power Path Function)

The $V_{USB}$ power path function is enabled, for example, when the power supply BAT cannot be used due to overdischarge or the like. The processor 21 controls the switch Q1 to be ON, controls the switch Q2 to be ON, controls the switch Q3 to be OFF, and controls the switch Q4 to be OFF. Accordingly, the USB voltage $V_{USB}$ input to the input terminal VBUS is directly output from the switching terminal SW without being stepped down. The voltage output from the switching terminal SW is input to the input terminal VIN of the step-up/step-down DC/DC converter 8 as the system power supply voltage Vcc0. Also in this case, the step-up/step-down DC/DC converter 8 also steps down the system power supply voltage Vcc0 of 5 V input to the input terminal VIN to generate and output the system power supply voltage Vcc1 of 3.3 V. Even when the $V_{USB}$ power path function is enabled, the processor 21 may perform the ON/OFF control of the switch Q2 in a state where the switch Q1 is controlled to be ON, the switch Q3 is controlled to be OFF, and the switch Q4 is controlled to be ON. In this manner, stepping down of the voltage from the USB voltage $V_{USB}$ of 5.0 V to the system power supply voltage Vcc1 of 3.3 V can be performed by the charging IC 2 and the step-up/step-down DC/DC converter 8 in a shared manner. Therefore, concentration of a load and heat generation on the step-up/step-down DC/DC converter 8 may be prevented.

($V_{USB}$ & $V_{BAT}$ Power Path Function)

The $V_{USB}$ & $V_{BAT}$ power path function is enabled, for example, when the charging of the power supply BAT is completed and the USB connection is continued. The processor 21 performs the ON/OFF control of the switch Q2 while controlling the switch Q1 to be turned on, the switch Q3 to be turned off, and the switch Q4 to be turned on. The processor 21 controls the switch Q2 such that the voltage of the output terminal SYS is equal to a voltage of the power supply BAT (the power supply voltage $V_{BAT}$). Accordingly, the USB voltage $V_{USB}$ input to the input terminal VBUS is stepped down and output from the output terminal SYS. The voltage output from the output terminal SYS after stepping down the USB voltage $V_{USB}$ input to the input terminal VBUS and a voltage output from the output terminal SYS from the power supply BAT via the charging terminal bat have the same value. Therefore, a power including the voltage obtained by stepping down the USB voltage $V_{USB}$ and a power including the power supply voltage $V_{BAT}$ output from the output terminal SYS are combined and supplied to the input terminal VIN of the step-up/step-down DC/DC converter 8. When the $V_{USB}$ & $V_{BAT}$ power path function is enabled, in the charging IC 2, the potential of the input terminal VBUS is higher than the potential of the output terminal SYS, and thus the power from the power supply BAT is not output from the input terminal VBUS.

When the $V_{USB}$ & $V_{BAT}$ power path function is enabled, the step-up/step-down DC/DC converter 8 determines which of the step-up and the step-down is to be performed depending on a magnitude of the power supply voltage $V_{BAT}$. When the power supply voltage $V_{BAT}$ is 3.3 V or more, the step-up/step-down DC/DC converter 8 steps down the system power supply voltage Vcc0 input to the input terminal VIN to generate and output the system power supply voltage Vcc1 of 3.3 V. When the power supply voltage $V_{BAT}$ is less than 3.3 V, the step-up/step-down DC/DC converter 8 steps up the system power supply voltage Vcc0 input to the input terminal VIN to generate and output the system power supply voltage Vcc1 of 3.3 V.

($V_{BAT}$ Power Path Function)

The $V_{BAT}$ power path function is enabled in a mode (for example, the sleep mode) other than the charging mode. The processor 21 controls the switch Q1 and the switch Q3 to be turned off. Accordingly, the power supply voltage $V_{BAT}$ input to the charging terminal bat is directly output from the output terminal SYS, and is input to the input terminal VIN of the step-up/step-down DC/DC converter 8 as the system power supply voltage Vcc0. By this control, a power transmission path between the input terminal VBUS and the switching terminal SW of the charging IC 2 is blocked by a parasitic diode of the switch Q1. Therefore, the power supply voltage $V_{BAT}$ output from the output terminal SYS is not output from the input terminal VBUS.

When the $V_{BAT}$ power path function is enabled, the step-up/step-down DC/DC converter 8 determines which of the step-up and the step-down is to be performed depending on the magnitude of the power supply voltage $V_{BAT}$. When the power supply voltage $V_{BAT}$ input to the input terminal VIN is 3.3 V or more, the step-up/step-down DC/DC converter 8 steps down the power supply voltage $V_{BAT}$ to generate and output the system power supply voltage Vcc1 of 3.3 V. When the power supply voltage $V_{BAT}$ input to the input terminal VIN is less than 3.3 V, the step-up/step-down DC/DC converter 8 steps up the power supply voltage $V_{BAT}$ to generate and output the system power supply voltage Vcc1 of 3.3 V.

(OTG Function)

The OTG function is enabled simultaneously with the $V_{BAT}$ power path function, for example, enabled in the active mode. When both the OTG function and the $V_{BAT}$ power path function are enabled, the processor 21 performs the ON/OFF control of the switch Q3 while controlling the switch Q1 to be turned on. Accordingly, the power supply voltage $V_{BAT}$ input to the charging terminal bat is directly output from the output terminal SYS, and is input to the input terminal VIN of the step-up/step-down DC/DC converter 8 as the system power supply voltage Vcc0. The power supply voltage $V_{BAT}$ output from the output terminal SYS is input to the switching terminal SW of the charging IC 2. The processor 21 controls the switch Q3 such that the power supply voltage $V_{BAT}$ input to the switching terminal SW is equal to the system power supply voltage Vcc4. Accordingly, the power supply voltage $V_{BAT}$ input to the switching terminal SW is stepped up and output from the input terminal VBUS. The voltage output from the input terminal VBUS is input to the LEDs L1 to L8 as the system power supply voltage Vcc4.

As described above, the charging IC 2 has both a function as a step-down converter which steps down the USB voltage $V_{USB}$ and a function as a step-up converter which steps up the power supply voltage $V_{BAT}$. The voltage input from the charging IC 2 to the step-up/step-down DC/DC converter 8 varies in various ways according to an enabled function of the charging IC 2. However, even if such a variation occurs, the step-up/step-down DC/DC converter 8 selectively performs the step-up and the step-down, so that the system power supply voltage Vcc1 (a power including the system power supply voltage Vcc1) may be kept constant. When a voltage of the system power supply voltage Vcc0 input to the input terminal VIN of the step-up/step-down DC/DC converter 8 is equal to 3.3 V which is a voltage of the system power supply voltage Vcc1, the step-up/step-down DC/DC converter 8 outputs the system power supply voltage Vcc0 as the system power supply voltage Vcc1 from the output terminal VOUT without performing the step-up and the step-down.

<Power Consumption of Electric Circuit>

In the inhaling system including the inhaler 100, it is the heater HTR which consumes the most power among all loads included in the system. For example, power consumption $P_{HTR}$ by the heater HTR is larger than power consumption $P_{LED}$ by each of the LEDs L1 to L8. The power consumption by the heater HTR is larger than a total value of power consumption by all electronic components connected to the output terminal SYS of the charging IC 2. Therefore, it is preferable that a current value that the step-up DC/DC converter 9 connected to the heater HTR may receive supply from the power supply BAT is larger than a maximum current value which may be output by the output terminal SYS of the charging IC 2.

Preferred Embodiment of Step-Up/Step-Down DC/DC Converter 8

From a viewpoint of reducing a cost and size of the step-up/step-down DC/DC converter 8, at least one of a maximum input current and a maximum output current of the step-up/step-down DC/DC converter 8 is preferably smaller than the maximum current which may be output by the output terminal SYS of the charging IC 2. With such a configuration, when the output terminal SYS of the charging IC 2 outputs the maximum current, there is a possibility that an excessive current will be input to the step-up/step-down DC/DC converter 8. However, since the heater HTR which consumes the most power is not connected to the output terminal VOUT of the step-up/step-down DC/DC converter 8, the excessive current is not input to the step-up/step-down DC/DC converter 8. Therefore, even with such a configuration, the step-up/step-down DC/DC converter 8 does not cause any problems, and the cost and size may be reduced.

Preferred Embodiment of Step-Up DC/DC Converter 9

The step-up DC/DC converter 9 is preferably a switching regulator. In the example of FIG. 20, the step-up DC/DC converter 9 steps up the voltage by operating in any one of a pulse frequency modulation (PFM) mode for performing a PFM control or a pulse width modulation (PWM) mode for performing a PWM control. Specifically, the step-up DC/DC converter 9 is equipped with a mode terminal MODE for mode switching, and is configured to be able to switch the operation mode according to potential of the mode terminal MODE. A maximum current which can be input to the switching terminal SW of the step-up DC/DC converter 9 when the step-up DC/DC converter 9 operates in the PFM mode is preferably larger than a maximum current which may be input to the switching terminal SW of step-up DC/DC converter 9 when the step-up DC/DC converter 9 operates in the PWM mode.

A voltage applied to the heater HTR differs greatly between the heating control and the temperature detection control. That is, a load of the step-up DC/DC converter 9 fluctuates between a heavy load and a light load. In the PWM mode, since a switching frequency is constant regardless of the load, a switching loss becomes dominant when the load is light, and efficiency decreases. On the other hand, since the PFM mode does not require much additional power when the load is light, the switching frequency is lowered and the switching loss is reduced. Therefore, high efficiency may be maintained even at a light load. As a degree of the load increases from light to heavy, the relationship reverses, and the efficiency in the PWM mode is higher than that in the PFM mode. The degree of the load in which the efficiency in the PWM mode is higher is in a limited range. Therefore, when the load of the step-up DC/DC converter 9 fluctuates between the heavy load and the light load, the step-up DC/DC converter 9 preferably operates in the PFM mode.

When operating in any one of the PWM mode and the PFM mode, the efficiency of the step-up DC/DC converter 9 tends to decrease near the maximum current which may be input to the step-up DC/DC converter 9 or the maximum current which may be output by the step-up DC/DC converter 9. In particular, when operating in the PFM mode, since there are the characteristics in the PFM mode that the efficiency decreases at the heavy load as described above, the efficiency of the DC/DC converter decreases near the maximum current due to two factors. Therefore, as described above, the step-up DC/DC converter 9 is used in which the maximum current which may be input to the switching terminal SW of the step-up DC/DC converter 9 when operating in the PFM mode is larger than the maximum current which may be input to the switching terminal SW of the step-up DC/DC converter 9 when operating in the PWM mode. Accordingly, even if the step-up DC/DC converter 9 operates in the PFM mode, it is possible to prevent the decrease in the efficiency under the heavy load.

From the viewpoint of the efficiency described above, it is preferable that the potential of the mode terminal MODE is maintained at potential at which the PFM mode is selected. In the example of FIG. 20, since the mode terminal MODE is in a state of not being connected to anywhere, the operation mode of the step-up DC/DC converter 9 is fixed to the PFM mode. Accordingly, a larger current may be input to the switching terminal SW of the step-up DC/DC converter 9, and a larger current may be supplied to the heater HTR. It should be noted that such a configuration in which the potential of the mode terminal MODE is made indefinite is merely a specific example. Depending on specifications of the step-up DC/DC converter 9, the PFM mode may be selected by setting the potential of the mode terminal MODE to a high level or a low level. In such a case, the potential of the mode terminal MODE may be maintained at an appropriate potential such that the PFM mode is selected.

<Effects of Inhaler>

According to the inhaler 100, the voltage is not directly supplied from the power supply BAT to the LEDs L1 to L8 as the notification unit, but is supplied via the charging IC 2. Although the voltage of the power supply BAT fluctuates, the fluctuating voltage is not directly supplied to the LEDs L1 to L8, so that the LEDs L1 to L8 may be stably operated. The luminance of the LEDs depends on the supplied voltage, the luminance of the LEDs L1 to L8 may be stabilized when a stable voltage may be supplied to the LEDs L1 to L8. Since the charging IC 2, whose main function is to perform the charging control of the power supply BAT, generates the system power supply voltage Vcc4 and supplies the system power supply voltage Vcc4 to the LEDs L1 to L8, there is no need for a dedicated IC for generating the system power supply voltage Vcc4. Therefore, the size and cost of the inhaler 100 may be reduced. Since the charging IC 2 steps up the power supply voltage $V_{BAT}$ to generate the system power supply voltage Vcc4, high-voltage power may be supplied to the LEDs L1 to L8. Accordingly, the LEDs L1 to L8 may be turned on with high luminance, and a good user interface may be achieved.

According to the inhaler 100, the power is supplied to the MCU 1 via the charging IC 2 instead of directly being supplied to the MCU 1 from the power supply BAT. Since the charging IC 2, whose main function is to perform the charging control of the power supply BAT, generates the system power supply voltage Vcc0 and supplies the system power supply voltage Vcc0 to the MCU 1, there is no need for a dedicated IC for generating the system power supply voltage Vcc0. Therefore, the size and cost of the inhaler 100 may be reduced. Since the step-up/step-down DC/DC converter 8 is provided between the charging IC 2 and the MCU 1, constant power may be supplied to the MCU 1. Accordingly, the operation of the MCU 1 may be stabilized.

According to the inhaler 100, the OTG function cannot be executed when the USB connection is established and the LSW 3 is closed. Therefore, power consumption of the power supply BAT during the USB connection may be prevented, and a usable power amount of the power supply BAT may be increased. Since the LSW 3 is open immediately after the USB connection is established, the noise and rush current immediately after the USB connection is established are not supplied to the LEDs L1 to L8, and a possibility of failure in the LEDs L1 to L8 may be reduced. The OTG function may be executed immediately after the USB connection is established. Therefore, even in a transition period during which power cannot be supplied from the external power supply to the LEDs L1 to L8 immediately after the USB connection is established, power may be supplied from the power supply BAT to the LEDs L1 to L8 by the OTG function. Therefore, an opportunity to cause the LEDs L1 to L8 to operate may be increased, and marketability of the inhaler 100 may be improved.

According to the inhaler 100, the charging IC 2 may supply the power of the power supply BAT to a load such as the MCU 1, and thus, a dedicated IC for supplying the power to the load becomes unnecessary, and the cost of the inhaler 100 may be reduced.

A notification unit other than the LEDs L1 to L8 may be further connected to the input terminal VBUS of the charging IC 2. For example, the input terminal VBUS of the charging IC 2 and the vibration motor M may be connected, and the system power supply voltage Vcc4 and the USB voltage $V_{USB}$ are supplied to the vibration motor M, or the input terminal VBUS of the charging IC 2 and a speaker (not illustrated) may be connected, and the system power supply voltage Vcc4 and the USB voltage $V_{USB}$ are supplied to the speaker. An IC other than the notification unit (an IC separate from the IC illustrated in FIG. 10) may be connected to the input terminal VBUS of the charging IC 2. It is preferable that at least one of the notification unit and the separate IC, as a load, is connected to the input terminal VBUS of the charging IC 2.

The inhaler 100 has a first discharging path which supplies the power from the power supply BAT to the MCU 1 via the charging IC 2, and a second discharging path which supplies the power from the power supply BAT to the heater HTR without passing through the charging IC 2. Therefore, a value of a current to flow through the first discharging path (the maximum current which may be output by the output terminal SYS of the charging IC 2) may be smaller than a value of a current to flow through the second discharging path. Therefore, an expensive and large-scale charging IC 2 which may withstand a large current becomes unnecessary, and the size and cost of the inhaler 100 may be reduced. The MCU 1 and the heater HTR may operate simultaneously, and when the MCU 1 and the heater HTR operate simultaneously, existence of the first discharging path and the second discharging path also allows sufficient power to be supplied to the MCU 1 and the heater HTR without imposing an excessive load on the charging IC 2.

According to the inhaler 100, the second discharging path through which a large current flows is provided on a board separate from the first discharging path. Specifically, the first discharging path is provided on the MCU-mounted board 161 and the second discharging path is provided on the receptacle-mounted board 162. Therefore, heat concentration on one board may be avoided, and durability of the inhaler 100 may be improved.

According to the inhaler 100, all the electronic components which receive the power supply from the power supply BAT without passing through the charging IC 2 are provided on the same board (the receptacle-mounted board 162). Therefore, it is possible to prevent the electric circuit from becoming complicated.

According to the inhaler 100, the step-up DC/DC converter 9 is provided in a discharging path which discharges the power from the power supply BAT to the heater HTR. Therefore, large power may be supplied to the heater HTR by the step-up DC/DC converter 9 without worry about the maximum current of the output terminal SYS of the charging IC 2. Therefore, it is possible to efficiently heat the rod 500 by the heater HTR while reducing the cost and size of the inhaler 100.

The inhaler 100 has a discharging path (a path from the receptacle RCP to the LEDs L1 to L8) which discharges power to the LEDs L1 to L8 without passing through the charging IC 2 during the USB connection. Accordingly, the expensive and large-scale charging IC 2 which may withstand a large current is not required compared to a case of providing a path which discharges power from the external power supply to the LEDs L1 to L8 via the charging IC 2. Therefore, the cost and size of the inhaler 100 may be reduced.

In the inhaler 100, the electronic component connected to the input terminal VBUS of the charging IC 2 is a notification unit such as the LEDs L1 to L8, or an IC separate from the illustrated ICs. Therefore, power from the external power supply, which is prone to the noise and rush current, may be prevented from being supplied to precision electronic components such as the MCU 1, the step-up/step-down DC/DC converter 8, the ROM 6, the remaining amount meter IC 12, the protection IC 10, and the step-up DC/DC converter 9, and the durability can be improved.

In the inhaler 100, the overvoltage protection IC 11 is provided between the LSW 3 and the receptacle RCP. Due to the presence of the overvoltage protection IC 11, not only the LSW 3 but also the overvoltage protection IC 11 can block the noise and rush current which may occur at the moment of establishing the USB connection. Accordingly, the durability of the inhaler 100 may be improved.

The inhaler 100 is configured such that each of the LEDs L1 to L8 does not operate unless a built-in switch of the MCU 1 is turned on. Therefore, it is possible to prevent the noise and rush current immediately after the USB connection is established from being supplied to the LEDs L1 to L8, and reduce the possibility of failure in the LEDs L1 to L8. Since the switch is built in the MCU 1, the durability of the switch may be improved as compared with that in the case where the switch is provided outside the MCU 1.

Among the voltages supplied to the load by the inhaler 100, the system power supply voltage Vcc4 and the drive voltage $V_{bst}$ are the larger voltages. The system power supply voltage Vcc4 is generated from the power from the external power supply and the power from the power supply BAT. On the other hand, the drive voltage $V_{bst}$ is generated only by the power from the power supply BAT. In this way, the drive voltage $V_{bst}$ is not generated from the power of the external power supply, so that a line through which high-voltage power flows may be prevented from becoming complicated. Accordingly, since a complicated circuit is avoided, the cost of the inhaler 100 may be reduced. A power supply path to which power including the system power supply voltage Vcc4 is supplied and a power supply path to which power including the drive voltage $V_{bst}$ is supplied are present on different boards. Specifically, the power supply path to which the power including the system power supply voltage Vcc4 is supplied is provided in the MCU-mounted board 161 and the LED-mounted board 163. The power supply path to which the power including the drive voltage $V_{bst}$ is supplied is provided in the receptacle-mounted board 162. In this way, by providing the two power supply paths to which a high voltage is applied on different boards, it is possible to prevent that noise of these power supply paths is superimposed and becomes more difficult to deal with. Therefore, the inhaler 100 may stably operate.

In the inhaler 100, the power supply connector connected to the power supply BAT, the receptacle RCP connected to the external power supply, and the heater connector Cn connected to the heater HTR are provided on the same board (the receptacle-mounted board 162). Accordingly, the generation of heat at various locations in the inhaler 100 is prevented, and thus, the durability of the inhaler 100 is improved.

Although various embodiments have been described above with reference to the drawings, it is needless to say that the present invention is not limited to these examples. It is apparent to those skilled in the art that various changes and modifications may be conceived within the scope described in the claims, and it is understood that the changes and the modifications naturally fall within the technical scope of the present invention.

For example, a connector may be configured to be connected between the output terminal VOUT of the step-up DC/DC converter 9 and the ground line to connect a heater other than the heater HTR (a heating object is different from the heater HTR) or other loads.

In FIG. 10, the parallel circuit of the circuit including the switch S3 and the circuit including the switch S4 and the resistor Rs is connected between the output terminal VOUT of the step-up DC/DC converter 9 and the positive electrode side of the heater connector Cn, but this parallel circuit may be connected between the negative electrode side of the heater connector Cn and the switch S6, and the output terminal VOUT of the step-up DC/DC converter 9 and the positive electrode side of the heater connector Cn may be directly connected.

In the present description, at least the following matters are described. In parentheses, corresponding constituent components and the like in the embodiment described above are indicated, but the present invention is not limited thereto.

(1) A power supply unit (inhaler 100) for an aerosol generating device, including:

a power supply (power supply BAT);

a heater connector (heater connector Cn) connected to a heater (heater HTR) configured to heat an aerosol source by consuming power supplied from the power supply;

a connector (receptacle RCP) electrically connectable to an external power supply;

a charging IC (charging IC 2) which includes an input terminal (input terminal VBUS) connected to the connector and a charging terminal (charging terminal bat) connected to the power supply, and is configured to convert power input to the input terminal and output power, which is converted, from the charging terminal; and a first load (LEDs L1 to L8) having one end connected in parallel with the input terminal, in which the charging IC is configured to supply power input from the power supply to the charging terminal to the first load via the input terminal.

According to (1), the power from the power supply can be supplied from the charging IC to the first load without requiring a dedicated IC. Therefore, it is possible to realize miniaturization and cost reduction of the aerosol generating device by eliminating a need for a dedicated IC while achieving higher functionality by providing the first load.

(2) The power supply unit for an aerosol generating device according to (1), in which the charging IC is configured to generate high-voltage power (power including system power supply voltage Vcc4) by stepping up the power input from the power supply to the charging terminal, and supply the high-voltage power to the first load via the input terminal.

Generally, the higher the applied voltage, the more efficient and higher the performance of the load. According to (2), since a voltage higher than the voltage of the power supply can be applied to the first load, high performance can be exhibited while the first load is efficiently used.

(3) The power supply unit for an aerosol generating device according to (1), in which the charging IC is configured not to supply the power input from the power supply to the charging terminal to the first load via the input terminal when power supplied from the connector is to be supplied to the first load (when the USB connection is established).

According to (3), since power can be supplied to the first load without using power stored in the power supply, an amount of power of a usable power supply can be increased after the external power supply is disconnected from the connector.

(4) The power supply unit for an aerosol generating device according to (1), in which when the external power supply is electrically connected to the connector, the external power supply and the first load are not electrically connected.

According to (4), since noise and an inrush current immediately after the external power supply is connected is not supplied to the first load, a possibility that the first load fails can be reduced.

(5) The power supply unit for an aerosol generating device according to (4), in which when the external power supply is electrically connected to the connector and the external power supply and the first load are not electrically connected (when the USB connection is detected and immediately before the bipolar transistor S2 is turned off), the charging IC is configured to supply the power input from the power supply to the charging terminal to the first load via the input terminal (OTG function is enabled).

According to (5), since the power can be supplied from the power supply to the first load even when the external power supply cannot be used, opportunities to operate the first load can be increased, and the marketability of the aerosol generating device can be improved.

(6) The power supply unit for an aerosol generating device according to (1), further including:

a switch (LSW 3) provided between the connector and the input terminal; and a controller (MCU 1) configured to control opening and closing of the switch.

According to (6), the noise and the inrush current immediately after the external power supply is connected can be prevented from being supplied to the first load by opening and closing control of the switch, and the possibility that the first load fails can be reduced.

(7) The power supply unit for an aerosol generating device according to (6), in which when the switch is opened, the charging IC is configured to supply the power input from the power supply to the charging terminal to the first load via the input terminal.

According to (7), the power can be supplied from the power supply to the first load even when the external power supply cannot be used. Therefore, opportunities to operate the first load can be increased, and the marketability of the aerosol generating device can be improved.

(8) The power supply unit for an aerosol generating device according to (6) or (7), in which the switch is opened when the external power supply is electrically connected to the connector.

According to (8), since the noise and the inrush current immediately after the external power supply is connected is not supplied to the first load, the possibility that the first load fails can be reduced.

(9) The power supply unit for an aerosol generating device according to (8), in which the controller is configured to close the switch after the external power supply is electrically connected to the connector.

According to (9), the noise and the inrush current immediately after the external power supply is connected are not supplied to the first load, and thereafter the power supplied from the external power supply can be supplied to the first load. Therefore, it is possible to safely operate the first load using the external power supply while reducing the possibility that the first load fails. In addition, after the external power supply is disconnected from the connector, the amount of power of the usable power supply can be increased.

(10) The power supply unit for an aerosol generating device according to any of (1) to (9), in which:

the charging IC includes an output terminal (output terminal SYS);

a second load (MCU 1) having one end (power supply terminal VDD) connected to the output terminal is further provided; and the charging IC is configured to supply the power input from the power supply to the charging terminal to the second load via the output terminal ($V_{BAT}$ power path function).

According to (10), since the charging IC can supply the power of the power supply to the second load, a dedicated IC for supplying the power to the second load is unnecessary, and the size and cost of the aerosol generating device can be reduced.

(11) The power supply unit for an aerosol generating device according to (10), in which the second load is operable at a voltage (system power supply voltage Vcc2=3.3 V) lower than a full charge voltage (4.2 V) of the power supply.

According to (11), in order to operate the second load, a step-up converter for greatly stepping up an output voltage of the power supply is unnecessary. Therefore, it is possible to reduce the cost of the aerosol generating device, prevent power loss associated with a high pressure rising rate, and improve use efficiency of the power supply.

(12) The power supply unit for an aerosol generating device according to (11), in which the second load is operable at a voltage lower than a nominal voltage (3.7 V) of the power supply.

According to (12), in order to operate the second load, a step-up converter for greatly stepping up the output voltage of the power supply is unnecessary. Therefore, it is possible to reduce the cost of the aerosol generating device, prevent power loss associated with a high pressure rising rate, and improve use efficiency of the power supply.

(13) The power supply unit for an aerosol generating device according to (11) or (12), further including:

a voltage converter (step-up/step-down DC/DC converter 8) connected between the output terminal and the second load and configured to output a constant voltage.

According to (13), since a constant voltage can be supplied to the second load, the operation of the second load is stabilized.

(14) The power supply unit for an aerosol generating device according to (10), in which the charging IC is configured to supply the power input to the input terminal to the second load via the output terminal ($V_{USB}$ power path function).

According to (14), since the power from the external power supply can be supplied to the second load, consumption of the power stored in the power supply can be prevented. Therefore, after the external power supply is disconnected from the connector, the amount of power of the usable power supply can be increased. In addition, even when the power supply cannot be used due to overdischarge or the like, the second load can be operated.

The power supply unit for an aerosol generating device according to (14), further including:

a step-up/step-down DC/DC converter (step-up/step-down DC/DC converter 8) connected between the output terminal and the one end (power supply terminal VDD) of the second load, in which the step-up/step-down DC/DC converter is configured to:

step up or step down an input voltage to output a constant voltage when power input from the charging terminal is output from the output terminal (when $V_{BAT}$ power path function is enabled); and step down an input voltage to output the constant voltage when power input from the input terminal is output from the output terminal (when $V_{USB}$ power path function is enabled).

According to (15), since a constant voltage is supplied to the second load when either the external power supply or the power supply is used, the operation of the second load is stabilized.

(16) The power supply unit for an aerosol generating device according to any of (1) to (15), in which the first load includes a notification unit (LEDs L1 to L8) which notifies a user of information.

When the power input from the power supply to the charging terminal is supplied to the first load via the input terminal, a current in a direction opposite to an original direction of current assumed by the charging IC flows, so that a large current cannot flow. According to (16), the first load generally includes a notification unit having a small current consumption (power). Therefore, appropriate and sufficient power can be supplied from the charging IC to the first load, and the operation of the first load can be prevented from becoming insufficient.

(17) The power supply unit for an aerosol generating device according to any of (1) to (16), further including:

a controller (MCU 1) including a control terminal (control terminals PD1 to PD8) connected to an other end of the first load and a ground terminal (ground terminal GND) connected to a ground, in which the controller includes a built-in switch connected between the control terminal and the ground terminal.

According to (17), the noise and the inrush current immediately after the external power supply is connected can be prevented from being supplied to the first load by opening and closing control of the built-in switch of the controller. Therefore, the possibility that the first load fails can be reduced. In addition, since the switch is built in the controller, the switch is less likely to be damaged.

Although various embodiments have been described above with reference to the drawings, it is needless to say that the present invention is not limited to these examples. It is apparent to those skilled in the art that various changes and modifications may be conceived within the scope described in the claims, and it is understood that the changes and the modifications naturally fall within the technical scope of the present invention. In addition, the components described in the above embodiments may be optionally combined without departing from the spirit of the invention.

What is claimed is:

1. A power supply apparatus for an aerosol generating device, comprising:

a power supply;

a first electrical connector connected to a heater configured to heat an aerosol source by consuming power supplied from the power supply;

a second electrical connector electrically connectable to an external power supply;

a charging integrated circuit (IC) which includes an input terminal connected to the second electrical connector and a charging terminal connected to the power supply, and is configured to convert power input to the input terminal and output power which is converted from the charging terminal; and a first load having one end connected in parallel with the input terminal, wherein the charging IC is configured to supply power input from the power supply to the charging terminal to the first load via the input terminal.

2. The power supply apparatus of claim 1, wherein the charging IC is configured to generate high-voltage power by stepping up the power input from the power supply to the charging terminal, and supply the high-voltage power to the first load via the input terminal.

3. The power supply apparatus of claim 1, wherein the charging IC is configured not to supply the power input from the power supply to the charging terminal to the first load via the input terminal when power supplied from the second electrical connector is to be supplied to the first load.

4. The power supply apparatus of claim 1, wherein when the external power supply is electrically connected to the second electrical connector, the external power supply and the first load are not electrically connected.

5. The power supply apparatus of claim 4, wherein when the external power supply is electrically connected to the second electrical connector and the external power supply and the first load are not electrically connected, the charging IC is configured to supply the power input from the power supply to the charging terminal to the first load via the input terminal.

6. The power supply apparatus of claim 1, further comprising:

a switch provided between the second electrical connector and the input terminal; and a controller configured to control opening and closing of the switch.

7. The power supply apparatus of claim 6, wherein when the switch is opened, the charging IC is configured to supply the power input from the power supply to the charging terminal to the first load via the input terminal.

8. The power supply apparatus of claim 6, wherein the switch is opened when the external power supply is electrically connected to the second electrical connector.

9. The power supply apparatus of claim 8, wherein the controller is configured to close the switch after the external power supply is electrically connected to the second electrical connector.

10. The power supply apparatus of claim 1, wherein the charging IC includes an output terminal, the power supply apparatus includes a second load having one end connected to the output terminal, and the charging IC is configured to supply the power input from the power supply to the charging terminal to the second load via the output terminal.

11. The power supply apparatus of claim 10, wherein the second load is operable at a voltage lower than a full charge voltage of the power supply.

12. The power supply apparatus of claim 11, wherein the second load is operable at a voltage lower than a nominal voltage of the power supply.

13. The power supply apparatus of claim 11, further comprising:

a voltage converter connected between the output terminal and the second load and configured to output a constant voltage.

14. The power supply apparatus of claim 10, wherein the charging IC is configured to supply the power input to the input terminal to the second load via the output terminal.

15. The power supply apparatus of claim 14, further comprising:

a step-up/step-down DC/DC converter connected between the output terminal and the one end of the second load, wherein the step-up/step-down DC/DC converter is configured to step up or step down an input voltage to output a constant voltage when power input from the charging terminal is output from the output terminal; and step down an input voltage to output the constant voltage when power input from the input terminal is output from the output terminal.

16. The power supply apparatus of claim 1, wherein the first load includes a user interface configured to notify a user of information.

17. The power supply apparatus of claim 1, further comprising:

a controller including a control terminal connected to another end of the first load and a ground terminal connected to a ground, wherein the controller includes a built-in switch connected between the control terminal and the ground terminal.

* * * * *